(12) United States Patent
Kawauchi et al.

(10) Patent No.: US 8,175,204 B2
(45) Date of Patent: May 8, 2012

(54) RECEIVING DEVICE, SIGNAL PROCESSING METHOD, AND PROGRAM

(75) Inventors: Hidetoshi Kawauchi, Kanagawa (JP); Yuken Goto, Tokyo (JP); Takuya Okamoto, Chiba (JP); Toshiyuki Miyauchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 442 days.

(21) Appl. No.: 12/544,288

(22) Filed: Aug. 20, 2009

(65) Prior Publication Data

US 2010/0046652 A1 Feb. 25, 2010

(30) Foreign Application Priority Data

Aug. 21, 2008 (JP) ................. P2008-212653

(51) Int. Cl.
*H04B 1/10* (2006.01)
(52) U.S. Cl. .................... 375/350; 375/260; 375/349
(58) Field of Classification Search .......... 375/259–261, 375/285, 316, 320, 322, 324, 340, 346, 348–350
See application file for complete search history.

(56) References Cited

U.S. PATENT DOCUMENTS

| | | | |
|---|---|---|---|
| 6,614,852 B1 | 9/2003 | Laurent | |
| 7,701,841 B2 * | 4/2010 | Kawauchi et al. | 370/210 |
| 7,929,627 B2 * | 4/2011 | Kisoda et al. | 375/260 |
| 8,045,658 B2 * | 10/2011 | Kawauchi et al. | 375/344 |
| 8,045,945 B2 * | 10/2011 | Kawauchi et al. | 455/296 |
| 2003/0012308 A1 | 1/2003 | Sampath et al. | |
| 2003/0224731 A1 * | 12/2003 | Yamaura et al. | 455/63.3 |
| 2007/0070882 A1 * | 3/2007 | Kawauchi et al. | 370/210 |

FOREIGN PATENT DOCUMENTS

| | | |
|---|---|---|
| EP | 1 580 951 | 9/2005 |
| JP | 2005 287043 | 10/2005 |
| JP | 2005 312027 | 11/2005 |
| JP | 2007 202081 | 8/2007 |
| JP | 2009 232439 | 10/2009 |
| WO | WO 2006/128188 | 11/2006 |

* cited by examiner

*Primary Examiner* — Kevin M. Burd
*Assistant Examiner* — James M Perez
(74) *Attorney, Agent, or Firm* — Frommer Lawrence & Haug LLP; William S. Frommer; Paul A. Levy

(57) ABSTRACT

A receiving device includes: a pilot extracting section; a first estimating section; a second estimating section; a third estimating section; a distortion correcting section; and a filter controlling section.

12 Claims, 21 Drawing Sheets

RECEIVING DEVICE, SIGNAL PROCESSING METHOD, AND PROGRAM

BACKGROUND OF THE INVENTION

1. Field of the Invention

The present invention relates to a receiving device, a signal processing method, and a program, and particularly to a receiving device, a signal processing method, and a program that can prevent degradation in accuracy of estimating transmission line characteristics as characteristics of a transmission line of an OFDM (Orthogonal Frequency Division Multiplexing) signal.

2. Description of the Related Art

In terrestrial digital broadcasting and the like, OFDM is adopted as a data (signal) modulating system.

In OFDM, a large number of subcarriers orthogonal to each other are provided within a transmission band, and digital modulation such as PSK (Phase Shift Keying) and QAM (Quadrature Amplitude Modulation) that assigns data to the amplitude or phase of each subcarrier is performed.

OFDM divides the transmission band by the large number of subcarriers, and thus has a narrow band per subcarrier (wave) and a slow modulating speed. However, transmission speed of a total (the whole of the subcarriers) of OFDM is not different from that of an existing modulating system.

As described above, in OFDM, data is assigned to a plurality of subcarriers, and therefore modulation can be performed by an IFFT (Inverse Fast Fourier Transform) operation that performs an inverse Fourier transform. The demodulation of an OFDM signal obtained as a result of the modulation can be performed by an FFT (Fast Fourier Transform) operation that performs a Fourier transform.

Thus, a transmitting device for transmitting the OFDM signal can be formed by using a circuit that performs the IFFT operation, and a receiving device for receiving the OFDM signal can be formed by using a circuit that performs the FFT operation.

In addition, OFDM can improve resistance to a multipath by providing a signal interval referred to as a guard interval to be described later. Further, in OFDM, a pilot signal as a known signal (a signal known on the receiving device side) is inserted discretely in a time direction and a frequency direction. The receiving device uses the pilot signal for synchronization and estimation of transmission line characteristics.

OFDM has a strong resistance to multipaths, and is thus adopted in terrestrial digital broadcasting and the like that would be strongly affected by multipath interference. Standards for terrestrial digital broadcasting adopting OFDM include for example DVB-T (Digital Video Broadcasting-Terrestrial), ISDB-T (Integrated Services Digital Broadcasting-Terrestrial) and the like.

In OFDM, data is transmitted in units referred to as OFDM symbols.

FIG. 1 shows an OFDM symbol.

The OFDM symbol is composed of an effective symbol as a signal duration subjected to an IFFT at a time of modulation and a guard interval formed by copying the waveform of a part of the second half of the effective symbol to the head of the effective symbol as it is.

Supposing that the length of the effective symbol of the OFDM symbol, that is, effective symbol length not including the guard interval is Tu [seconds], and that an interval between OFDM subcarriers is Fc [Hz], the relation of an equation Fc=1/Tu holds.

OFDM improves resistance to multipaths by providing the guard interval at the head of the OFDM symbol as shown in FIG. 1.

In terrestrial digital broadcasting, a unit referred to as an OFDM transmission frame is defined, and the OFDM transmission frame is formed by a plurality of OFDM symbols.

For example, in the ISDB-T standard, one OFDM transmission frame is formed by 204 OFDM symbols. A position at which the pilot signal is inserted is determined in advance with the OFDM transmission frame as a unit.

Specifically, in OFDM using the modulation of the QAM system for modulation of each subcarrier, the phase or amplitude of subcarriers of an OFDM signal obtained by performing OFDM of data is affected differently for each subcarrier due to a multipath or the like at a time of transmission.

Thus, a receiving device performs distortion correction that equalizes the OFDM signal received from a transmitting device so that the amplitude and phase of subcarriers of the OFDM signal received from the transmitting device become equal to the amplitude and phase of the subcarriers of the OFDM signal transmitted by the transmitting device.

Specifically, in OFDM, the transmitting device discretely inserts a known pilot signal whose amplitude and phase are determined in advance within transmission symbols (symbols corresponding to subcarriers) forming OFDM symbols. Then, the receiving device estimates transmission line characteristics as characteristics (frequency characteristics) of a transmission line on the basis of the amplitude and phase of the pilot signal, and corrects distortion of the OFDM signal using transmission line characteristic data indicating the transmission line characteristics.

FIG. 2 shows an arrangement pattern of pilot signals within OFDM symbols.

Incidentally, in FIG. 2 (as in FIG. 5 and FIG. 6 to be described later), an axis of abscissas indicates subcarrier numbers identifying subcarriers of the OFDM signal, and an axis of ordinates indicates OFDM symbol numbers identifying OFDM symbols of the OFDM signal.

A subcarrier number corresponds to a frequency, and an OFDM symbol number corresponds to a time.

In FIG. 2, circular marks (white circular marks and black circular marks) represent a subcarrier of the OFDM signal or a transmission symbol (symbol on an IQ constellation as data for modulating a subcarrier on the transmitting device side) forming an OFDM symbol.

The black circular marks in FIG. 2 represent a pilot carrier as a subcarrier of the pilot signal.

The pilot carrier is arranged at a plurality of predetermined positions of the OFDM signal.

Specifically, for example, in the ISDB-T standard, the pilot signal (pilot carrier) is arranged in every four OFDM symbols (OFDM symbol numbers) in a time direction, and is arranged in every 12 subcarriers (subcarrier numbers) in a frequency direction.

FIG. 3 shows the configuration of an example of an existing receiving device for receiving the OFDM signal.

The receiving device in FIG. 3 includes an antenna 101, a tuner 102, a BPF (Band-Pass Filter) 103, an A/D (Analog/Digital) converter section 104, a quadrature demodulating section 105, an offset correcting section 106, a symbol timing regenerating section 107, an FFT section 108, a transmission line characteristic estimating section 109, a transmission line distortion correcting section 110, and an error correcting section 111.

The antenna 101 receives the broadcast wave of an OFDM signal transmitted (broadcast) from a transmitting device of a broadcasting station not shown in the figure, converts the broadcast wave into an RF (Radio Frequency) signal, and supplies the RF signal to the tuner 102.

The tuner 102 includes an arithmetic section 102A and a local oscillator 102B. The RF signal from the antenna 101 is supplied to the arithmetic section 102A.

In the tuner 102, the local oscillator 102B oscillates the signal of a sinusoidal wave of a predetermined frequency, and supplies the signal to the arithmetic section 102A.

Further, in the tuner 102, the arithmetic section 102A multiplies the RF signal from the antenna 101 by the signal from the local oscillator 102B, and thereby frequency-converts the RF signal into an IF (Intermediate Frequency) signal. The arithmetic section 102A supplies the IF signal to the BPF 103.

The BPF 103 filters the IF signal from the tuner 102, and supplies the result to the A/D converter section 104. The A/D converter section 104 subjects the IF signal from the BPF 103 to A/D conversion, and supplies the IF signal as a digital signal obtained as a result of the A/D conversion to the quadrature demodulating section 105.

The quadrature demodulating section 105 subjects the IF signal from the A/D converter section 104 to quadrature demodulation using a carrier of a predetermined frequency (carrier frequency). The quadrature demodulating section 105 outputs a baseband OFDM signal obtained as a result of the quadrature demodulation.

The OFDM signal output by the quadrature demodulating section 105 is a signal in a time domain before an FFT operation (immediately after a transmission symbol on the IQ constellation is subjected to an IFFT operation on the transmitting device side), and will hereinafter be referred to also as an OFDM time domain signal.

The OFDM time domain signal is a complex signal represented by a complex number including a real axis component (I (In Phase) component) and an imaginary axis component (Q (Quadrature Phase) component).

The OFDM time domain signal is supplied from the quadrature demodulating section 105 to the offset correcting section 106.

The offset correcting section 106 corrects the OFDM time domain signal from the quadrature demodulating section 105 for a sampling offset (a shift in sampling timing) in the A/D converter section 104 and for an offset of frequency of the carrier of the quadrature demodulating section 105 (a shift from frequency of the carrier used in the transmitting device).

The offset correcting section 106 further performs for example filtering for removing cochannel interference and adjacent channel interference as required.

The OFDM time domain signal processed by the offset correcting section 106 is supplied to the symbol timing regenerating section 107 and the FFT section 108.

The symbol timing regenerating section 107 is supplied with the OFDM time domain signal from the offset correcting section 106, and is also supplied with transmission line characteristics from the transmission line characteristic estimating section 109.

The symbol timing regenerating section 107 generates a symbol synchronizing signal indicating an FFT interval as an interval of the OFDM time domain signal as an object of the FFT operation in the FFT section 108 on the basis of the OFDM time domain signal from the offset correcting section 106 and the transmission line characteristics from the transmission line characteristic estimating section 109. The symbol timing regenerating section 107 then supplies the symbol synchronizing signal to the FFT section 108.

The FFT section 108 extracts the OFDM time domain signal (sample value of the OFDM time domain signal) of the FFT interval from the OFDM time domain signal from the offset correcting section 106 according to the symbol synchronizing signal supplied from the symbol timing regenerating section 107, and performs the FFT operation. An OFDM signal representing data transmitted on a subcarrier, that is, a transmission symbol on the IQ constellation is obtained by the FFT operation on the OFDM time domain signal.

The OFDM signal obtained by the FFT operation on the OFDM time domain signal is a signal in a frequency domain, and will hereinafter be referred to also as an OFDM frequency domain signal.

The FFT section 108 supplies the OFDM frequency domain signal obtained by the FFT operation to the transmission line characteristic estimating section 109 and the transmission line distortion correcting section 110.

The transmission line characteristic estimating section 109 estimates transmission line characteristics with respect to each subcarrier of the OFDM signal using the pilot signal arranged as shown in FIG. 2 in the OFDM frequency domain signal from the FFT section 108. The transmission line characteristic estimating section 109 then supplies transmission line characteristic data (estimated value of the transmission line characteristics) indicating the transmission line characteristics to the symbol timing regenerating section 107 and the transmission line distortion correcting section 110.

The transmission line distortion correcting section 110 performs distortion correction that corrects the OFDM frequency domain signal from the FFT section 108 for amplitude and phase distortion that the subcarriers of the OFDM signal undergo in a transmission line, using the transmission line characteristic data from the transmission line characteristic estimating section 109 (for example corrects distortion of the OFDM frequency domain signal by dividing the OFDM frequency domain signal by the transmission line characteristic data). The transmission line distortion correcting section 110 supplies the OFDM frequency domain signal after the distortion correction to the error correcting section 111.

The error correcting section 111 subjects the OFDM frequency domain signal from the transmission line distortion correcting section 110 to necessary error correction processing, that is, for example deinterleaving, de-puncturing, Viterbi decoding, spread signal removal, and RS (Reed-Solomon) decoding. The error correcting section 111 outputs decoded data obtained as a result of the error correction processing.

FIG. 4 shows an example of configuration of the transmission line characteristic estimating section 109 in FIG. 3.

The transmission line characteristic estimating section 109 in FIG. 4 includes a pilot extracting section 201, a reference signal generating section 202, an arithmetic section 203, a time direction characteristic estimating section 204, and a frequency direction characteristic estimating section 205. The frequency direction characteristic estimating section 205 includes a phase adjusting section 206, a phase offset calculating section 207, an upsampling section 208, and an interpolating filter 209.

The OFDM frequency domain signal supplied from the FFT section 108 to the transmission line characteristic estimating section 109 is supplied to the pilot extracting section 201.

The pilot extracting section 201 extracts the pilot signal arranged as shown in FIG. 2, for example, from the OFDM frequency domain signal from the FFT section 108. The pilot extracting section 201 supplies the pilot signal to the arithmetic section 203.

The reference signal generating section 202 generates a pilot signal identical to that included in the OFDM signal by the transmitting device. The reference signal generating section 202 supplies the arithmetic section 203 with the pilot signal as a reference signal serving as a reference in estimating transmission line characteristics with respect to the pilot signal included in the OFDM frequency domain signal.

In the ISDB-T standard and the DVB-T standard, the pilot signal is obtained by subjecting predetermined data to BPSK (Binary Phase Shift Keying) modulation. The reference signal generating section 202 generates the signal obtained by subjecting the predetermined data to BPSK modulation, and supplies the signal as the reference signal to the arithmetic section 203.

Incidentally, the predetermined data that becomes the pilot signal is determined in advance for an OFDM symbol number and a subcarrier number at a position at which the pilot signal (transmission symbol of the pilot signal) is disposed.

The reference signal generating section 202 generates a pilot signal obtained by performing BPSK modulation of predetermined data determined in advance for an OFDM symbol number and a subcarrier number at a position of the pilot signal (transmission symbol of the pilot signal) extracted by the pilot extracting section 201. The reference signal generating section 202 supplies the pilot signal as the reference signal to the arithmetic section 203.

The arithmetic section 203 estimates transmission line characteristics with respect to the pilot signal (hereinafter referred to also as transmission line characteristics at the position of the pilot signal) by dividing the pilot signal from the pilot extracting section 201 by the reference signal from the reference signal generating section 202. The arithmetic section 203 supplies transmission line characteristic data indicating the transmission line characteristics to the time direction characteristic estimating section 204.

Distortion that the OFDM signal undergoes in a transmission line (distortion caused by a multipath and the like) is a multiplication of the OFDM signal. Thus, the component of the distortion that the OFDM signal undergoes in the transmission line, that is, the transmission line characteristics at the position of the pilot signal can be estimated by dividing the pilot signal from the pilot extracting section 201 by the reference signal.

The time direction characteristic estimating section 204 estimates transmission line characteristics in which interpolation in a time direction is performed using the transmission line characteristic data indicating the transmission line characteristics at the position of the pilot signal in a symbol number direction (time direction). The time direction characteristic estimating section 204 supplies transmission line characteristic data indicating the transmission line characteristics (which data will hereinafter be referred to also as time direction interpolation characteristic data) to the frequency direction characteristic estimating section 205.

Incidentally, the time direction interpolation characteristic data obtained in the time direction characteristic estimating section 204 is not only supplied to the frequency direction characteristic estimating section 205 but also supplied to the symbol timing regenerating section 107 as required. The symbol timing regenerating section 107 obtains the delay spread of a multipath or the like from the time direction interpolation characteristic data and generates the symbol synchronizing signal using the delay spread as required.

The frequency direction characteristic estimating section 205 estimates transmission line characteristics in which interpolation in a frequency direction is performed, that is, transmission line characteristics with respect to each of subcarriers of OFDM symbols, by filtering the time direction interpolation characteristic data from the time direction characteristic estimating section 204. The frequency direction characteristic estimating section 205 supplies transmission line characteristic data indicating the transmission line characteristics (hereinafter referred to also as frequency direction interpolation characteristic data) to the transmission line distortion correcting section 110.

Specifically, in the frequency direction characteristic estimating section 205, the time direction interpolation characteristic data from the time direction characteristic estimating section 204 is supplied to the phase adjusting section 206.

In the frequency direction characteristic estimating section 205, the phase offset calculating section 207 calculates a phase offset as a quantity for adjusting the phase of the time direction interpolation characteristic data from the time direction characteristic estimating section 204. The phase offset calculating section 207 supplies the phase offset to the phase adjusting section 206.

The phase adjusting section 206 adjusts the phase of the time direction interpolation characteristic data from the time direction characteristic estimating section 204 according to the phase offset from the phase offset calculating section 207. The phase adjusting section 206 supplies the time direction interpolation characteristic data after the phase adjustment to the upsampling section 208.

The upsampling section 208 generates time direction interpolation characteristic data whose data amount (number of sample values) is three times that of the original time direction interpolation characteristic data by interpolating for example two zeros as new sample values between sample values of the time direction interpolation characteristic data from the phase adjusting section 206. The upsampling section 208 supplies the time direction interpolation characteristic data to the interpolating filter 209.

The interpolating filter 209 is an LPF (Low Pass Filter) that performs filtering for interpolation in the frequency direction. The interpolating filter 209 filters the time direction interpolation characteristic data from the upsampling section 208.

The filtering by the interpolating filter 209 removes a repetitive component produced in the time direction interpolation characteristic data by the interpolation of zeros in the upsampling section 208, and provides frequency direction interpolation characteristic data indicating transmission line characteristics in which interpolation in the frequency direction is performed, that is, transmission line characteristics with respect to each of the subcarriers of the OFDM symbols.

The frequency direction interpolation characteristic data obtained in the interpolating filter 209 as described above is supplied to the transmission line distortion correcting section 110 as transmission line characteristic data to be used for correction of distortion of the OFDM signal.

FIG. 5 is a diagram of assistance in explaining the time direction interpolation characteristic data indicating the transmission line characteristics in which interpolation in the time direction is performed, the time direction interpolation characteristic data being obtained by the time direction characteristic estimating section 204 in FIG. 4 using the transmission line characteristic data at the position of the pilot signal in the arrangement shown in FIG. 2.

In FIG. 5, circular marks (white circular marks and hatched circular marks) represent a subcarrier (transmission symbol) of the OFDM signal.

The hatched circular marks in FIG. 5 represent a subcarrier whose transmission line characteristics are estimated (that has a sample value of the transmission line characteristic data (time direction interpolation characteristic data)) after processing in the time direction characteristic estimating section 204.

As shown in FIG. 5, the time direction characteristic estimating section 204 can obtain transmission line characteristics of every third subcarrier for each OFDM symbol.

FIG. 6 is a diagram of assistance in explaining the frequency direction interpolation characteristic data indicating the transmission line characteristics in which interpolation in the frequency direction is performed, the frequency direction interpolation characteristic data being obtained by the frequency direction characteristic estimating section 205 in FIG. 4 using the time direction interpolation characteristic data indicating the transmission line characteristics in which interpolation in the time direction is performed (transmission line characteristics of every third subcarrier) as indicated by the hatched circular marks in FIG. 5.

The frequency direction characteristic estimating section 205 obtains the transmission line characteristics of each of the subcarriers of an OFDM symbol (transmission line characteristics in which interpolation in the frequency direction is performed) which subcarriers are enclosed by a hatched rectangle in FIG. 6, using the time direction interpolation characteristic data in which transmission line characteristics are obtained for every third subcarrier in a subcarrier number direction (frequency direction).

Specifically, in the frequency direction characteristic estimating section 205, the phase adjusting section 206 adjusts the phase of the time direction interpolation characteristic data from the time direction characteristic estimating section 204 according to the phase offset supplied from the phase offset calculating section 207. The phase adjusting section 206 supplies the time direction interpolation characteristic data after the phase adjustment to the upsampling section 208.

The upsampling section 208 generates time direction interpolation characteristic data whose data amount is three times that of the original time direction interpolation characteristic data by interpolating two zeros as new sample values between sample values of the time direction interpolation characteristic data from the phase adjusting section 206. The upsampling section 208 supplies the time direction interpolation characteristic data to the interpolating filter 209.

That is, the time direction interpolation characteristic data supplied from the phase adjusting section 206 to the upsampling section 208 is a series of sample values indicating the transmission line characteristics of every third subcarrier as shown in FIG. 5, the series of sample values being obtained in the time direction characteristic estimating section 204.

Therefore, in the case of the time direction interpolation characteristic data supplied from the phase adjusting section 206 to the upsampling section 208, there are two subcarriers whose transmission line characteristics are not estimated between subcarriers whose transmission line characteristics are estimated. Thus, the upsampling section 208 interpolates two zeros as sample points of transmission line characteristics with respect to the two subcarriers whose transmission line characteristics are not estimated.

Thus, the number of zeros interpolated in the upsampling section 208 differs depending on the number of subcarriers at an interval of which transmission line characteristics are represented by the time direction interpolation characteristic data obtained in the time direction characteristic estimating section 204 as transmission line characteristic data.

When the upsampling section 208 interpolates two zeros between sample values of the time direction interpolation characteristic data from the phase adjusting section 206 as described above, the time direction interpolation characteristic data obtained as a result of the interpolation (hereinafter referred to also as zero-value interpolation characteristic data) includes a repetitive component in a time domain.

That is, the time direction interpolation characteristic data (transmission line characteristic data) is data obtained from the OFDM frequency domain signal, and is data in a frequency domain.

The time direction interpolation characteristic data and the zero-value interpolation characteristic data obtained by interpolating zeros in the time direction interpolation characteristic data are an identical signal as analog signal, and therefore the data in the time domain of the time direction interpolation characteristic data and the data in the time domain of the zero-value interpolation characteristic data are data of an identical frequency component.

In addition, the time direction interpolation characteristic data is a series of sample values indicating the transmission line characteristics of every third subcarrier. Because the interval between subcarriers is $Fc=1/Tu$ [Hz] as described above, an interval between sample values of the time direction interpolation characteristic data as series of sample values indicating the transmission line characteristics of every third subcarrier is $3Fc=3/Tu$ [Hz].

Therefore, an interval between sample values of the zero-value interpolation characteristic data obtained by interpolating two zeros between sample values of the time direction interpolation characteristic data is $Fc=1/Tu$ [Hz].

On the other hand, the time direction interpolation characteristic data whose interval between sample values is $3Fc=3/Tu$ [Hz] has $1/3Fc=Tu/3$ [seconds] as one cycle in the time domain.

The zero-value interpolation characteristic data whose interval between sample values is $Fc=1/Tu$ [Hz] has $1/Fc=Tu$ [seconds] as one cycle in the time domain, that is, has three times the cycle of the time direction interpolation characteristic data as one cycle.

The data in the time domain of the zero-value interpolation characteristic data having the same frequency component as the data in the time domain of the time direction interpolation characteristic data and having three times the cycle of the data in the time domain of the time direction interpolation characteristic data as one cycle as described above is formed by repeating the data in the time domain of the time direction interpolation characteristic data three times.

That is, FIG. 7 shows the data in the time domain of the zero-value interpolation characteristic data.

Incidentally, in order to simplify description, suppose in the following that a multipath is formed by two paths (a two-wave environment).

In FIG. 7 (as in FIG. 8, FIG. 9, and FIGS. 11 to 13 to be described later), an axis of abscissas indicates time, and an axis of ordinates indicates the power level of paths (OFDM signal).

The zero-value interpolation characteristic data (data in the time domain of the zero-value interpolation characteristic data) having a cycle of Tu [seconds] is formed by repeating a multipath corresponding to the time direction interpolation characteristic data (data in the time domain of the time direction interpolation characteristic data) having a cycle of Tu/3 [seconds] three times.

Supposing that a second (central) multipath (represented by hatching in FIG. 7) of multipaths corresponding to the time direction interpolation characteristic data repeated three times in the zero-value interpolation characteristic data is a desired multipath to be extracted as frequency direction interpolation characteristic data, obtaining the desired multipath corresponding to the frequency direction interpolation characteristic data needs removal of the other multipaths.

Accordingly, the interpolating filter 209 (FIG. 4) removes the multipaths other than the desired multipath by filtering the zero-value interpolation characteristic data. The interpolating filter 209 thereby extracts the desired multipath corresponding to the frequency direction interpolation characteristic data.

Incidentally, the zero-value interpolation characteristic data is data in the frequency domain, and the filtering of the zero-value interpolation characteristic data in the interpolating filter 209 is the convolution of the filter coefficient of the interpolating filter 209 and the zero-value interpolation characteristic data as data in the frequency domain.

The convolution in the frequency domain is a multiplication of a window function in the time domain. Therefore, the filtering of the zero-value interpolation characteristic data in the interpolating filter 209 can be expressed as a multiplication of the zero-value interpolation characteristic data (data in the time domain of the zero-value interpolation characteristic data) and a window function corresponding to the pass band of the interpolating filter 209 in the time domain.

In FIG. 7 (as in FIG. 8, FIG. 9, and FIGS. 11 to 13 to be described later), the filtering of the zero-value interpolation characteristic data is expressed as a multiplication of the zero-value interpolation characteristic data and the pass band (window function corresponding to the pass band) of the interpolating filter 209.

The cycle of the multipath repeated three times in the zero-value interpolation characteristic data is Tu/3 [seconds]. Therefore the desired multipath corresponding to the frequency direction interpolation characteristic data can be extracted by making the interpolating filter 209 for example an LPF having a band from −Tu/6 to +Tu/6 as a pass band whose bandwidth is the same as the cycle Tu/3 [seconds] of the multipath repeated three times.

Incidentally, noise included in the zero-value interpolation characteristic data (time direction interpolation characteristic data) can be reduced by adjusting the bandwidth of the pass band of the interpolating filter 209 (see Japanese Patent Laid-Open No. 2005-312027 hereinafter referred to as Patent Document 1, for example).

In addition, the phase adjusting section 206 (FIG. 4) adjusts the phase of the time direction interpolation characteristic data according to the phase offset supplied from the phase offset calculating section 207 so that the desired multipath is included within the pass band of the interpolating filter 209 as shown in FIG. 7.

Specifically, FIG. 8 shows the zero-value interpolation characteristic data obtained from the time direction interpolation characteristic data when the phase adjusting section 206 does not adjust the phase of the time direction interpolation characteristic data.

When the phase adjusting section 206 does not adjust the phase of the time direction interpolation characteristic data, a path as a part of the desired multipath (represented by hatching in FIG. 8) falls outside the pass band of the interpolating filter 209, and for example a path as a part of a multipath (on the left in FIG. 8) preceding the desired multipath is included within the pass band as pre-echo.

The phase adjusting section 206 adjusts the phase of the time direction interpolation characteristic data so that the whole of the desired multipath is included within the pass band of the interpolating filter 209.

The adjustment of the phase of the time direction interpolation characteristic data by the phase adjusting section 206 is performed by rotating a complex signal (an I-component and a Q-component) as a sample value of the time direction interpolation characteristic data according to the subcarrier number of a subcarrier corresponding to the sample value and the phase offset calculated in the phase offset calculating section 207.

Incidentally, the phase offset calculating section 207 for example obtains the delay spread of the multipath from the time direction interpolation characteristic data, and calculates the phase offset using the delay spread (see Patent Document 1, for example).

SUMMARY OF THE INVENTION

When the frequency direction interpolation characteristic data (series of sample values indicating transmission line characteristics with respect to each of subcarriers of OFDM symbols) is obtained by interpolating zeros in the time direction interpolation characteristic data and filtering the time direction interpolation characteristic data, the estimation of the transmission line characteristics is limited depending on the number of subcarriers at intervals of which sample values indicating the transmission line characteristics are obtained in the time direction interpolation characteristic data.

That is, when a sample value indicating transmission line characteristics is obtained for every N subcarriers in the time direction interpolation characteristic data, in order to obtain the frequency direction interpolation characteristic data by interpolating zeros in the time direction interpolation characteristic data and filtering the time direction interpolation characteristic data, a maximum delay time as a time difference between a first path (a path arriving first) of the desired multipath and a last path (a path arriving last) of the desired multipath needs to be Tu/N [seconds] or less.

Specifically, for example, in the ISDB-T standard and the DVB-T standard, a sample value indicating transmission line characteristics is obtained for every three subcarriers in the time direction interpolation characteristic data. Thus, in estimating transmission line characteristics, the maximum delay time needs to be Tu/3 [seconds] or less.

This is because as described with reference to FIG. 7, the zero-value interpolation characteristic data is formed by repeating the multipath corresponding to the time direction interpolation characteristic data (data in the time domain of the time direction interpolation characteristic data) having a cycle of Tu/3 [seconds] three times and therefore the bandwidth of the pass band of the interpolating filter 209 (FIG. 4) needs to be Tu/3 [seconds] equal to the cycle of the time direction interpolation characteristic data or less in order to extract only the desired multipath by the filtering of the interpolating filter 209.

FIG. 9 shows zero-value interpolation characteristic data when the maximum delay time of a multipath exceeds Tu/3 [seconds].

When the maximum delay time of a multipath exceeds Tu/3 [seconds], the whole from the first path to the last path of the desired multipath (represented by hatching in FIG. 9) is not contained within the pass band of the interpolating filter 209. Further, a path as a part of another multipath is included in the pass band of the interpolating filter 209.

In this case, the filtering by the interpolating filter 209 cannot extract only the desired multipath. As a result, transmission line characteristics indicated by the frequency direction interpolation characteristic data obtained in the interpolating filter 209 is degraded in accuracy.

As described above, when the maximum delay time of a multipath exceeds Tu/N [seconds], it is difficult to contain only the whole of the desired multipath within the pass band of the interpolating filter 209 no matter how the phase of the time direction interpolation characteristic data and the bandwidth of the pass band of the interpolating filter 209 whose pass band is only one band are adjusted. Thus, transmission line characteristic estimating accuracy (accuracy of estimation) is degraded, and in turn the receiving performance of the receiving device is degraded.

The present invention has been made in view of such a situation. It is desirable to prevent degradation in transmission line characteristic estimating accuracy.

According to a first embodiment of the present invention, there is provided a receiving device or a program for making a computer function as the receiving device, the receiving device including: pilot extracting means for extracting a pilot signal from an OFDM (Orthogonal Frequency Division Multiplexing) signal in which the pilot signal is arranged at a plurality of predetermined positions; first estimating means for estimating transmission line characteristics as characteristics of a transmission line of the OFDM signal with respect to the pilot signal using the pilot signal, and outputting transmission line characteristic data indicating the transmission line characteristics; second estimating means for estimating the transmission line characteristics in which interpolation in a time direction is performed using the transmission line characteristic data with respect to the pilot signal, and outputting transmission line characteristic data indicating the transmission line characteristics; third estimating means for estimating the transmission line characteristics in which interpolation in a frequency direction is performed by filtering the transmission line characteristic data indicating the transmission line characteristics in which interpolation in the time direction is performed by an interpolating filter used for interpolation, and outputting transmission line characteristic data indicating the transmission line characteristics; distortion correcting means for correcting distortion of the OFDM signal using the transmission line characteristic data indicating the transmission line characteristics in which interpolation in the frequency direction is performed; and filter controlling means for controlling a pass band of the interpolating filter, the filter controlling means being capable of control that makes the pass band of the interpolating filter a plurality of bands.

According to the first embodiment of the present invention, there is provided a signal processing method wherein when a receiving device for receiving an OFDM (Orthogonal Frequency Division Multiplexing) signal in which a pilot signal is arranged at a plurality of predetermined positions extracts the pilot signal from the OFDM signal, estimates transmission line characteristics as characteristics of a transmission line of the OFDM signal with respect to the pilot signal using the pilot signal and outputs transmission line characteristic data indicating the transmission line characteristics, estimates the transmission line characteristics in which interpolation in a time direction is performed using the transmission line characteristic data with respect to the pilot signal and outputs transmission line characteristic data indicating the transmission line characteristics, estimates the transmission line characteristics in which interpolation in a frequency direction is performed by filtering the transmission line characteristic data indicating the transmission line characteristics in which interpolation in the time direction is performed by an interpolating filter used for interpolation and outputs transmission line characteristic data indicating the transmission line characteristics, and corrects distortion of the OFDM signal using the transmission line characteristic data indicating the transmission line characteristics in which interpolation in the frequency direction is performed, as control of a pass band of the interpolating filter, control that makes the pass band of the interpolating filter a plurality of bands is performed.

In the first embodiment as described above, the pilot signal is extracted from the OFDM signal, transmission line characteristics as characteristics of a transmission line of the OFDM signal with respect to the pilot signal are estimated using the pilot signal, and transmission line characteristic data indicating the transmission line characteristics is output. Further, the transmission line characteristics in which interpolation in a time direction is performed are estimated using the transmission line characteristic data with respect to the pilot signal, and transmission line characteristic data indicating the transmission line characteristics is output. In addition, the transmission line characteristics in which interpolation in a frequency direction is performed are estimated by filtering the transmission line characteristic data indicating the transmission line characteristics in which interpolation in the time direction is performed by an interpolating filter used for interpolation, and transmission line characteristic data indicating the transmission line characteristics is output. Then, distortion of the OFDM signal is corrected using the transmission line characteristic data indicating the transmission line characteristics in which interpolation in the frequency direction is performed. In this case, as control of a pass band of the interpolating filter, control that makes the pass band of the interpolating filter a plurality of bands is performed.

According to a second embodiment of the present invention, there is provided a receiving device or a program for making a computer function as the receiving device, the receiving device including: pilot extracting means for extracting a pilot signal from an OFDM (Orthogonal Frequency Division Multiplexing) signal in which the pilot signal is arranged at a plurality of predetermined positions; first estimating means for estimating transmission line characteristics as characteristics of a transmission line of the OFDM signal with respect to the pilot signal using the pilot signal, and outputting transmission line characteristic data indicating the transmission line characteristics; second estimating means for estimating the transmission line characteristics in which interpolation in a time direction is performed using the transmission line characteristic data with respect to the pilot signal, and outputting transmission line characteristic data indicating the transmission line characteristics; third estimating means for estimating a plurality of the transmission line characteristics in which interpolation in a frequency direction is performed by filtering the transmission line characteristic data indicating the transmission line characteristics in which interpolation in the time direction is performed by each of a plurality of interpolating filters having different pass bands, and outputting pieces of transmission line characteristic data indicating the transmission line characteristics; a plurality of distortion correcting means for correcting distortion of the OFDM signal using each of the pieces of transmission line characteristic data indicating the plurality of the transmission line characteristics in which interpolation in the frequency direction is performed; signal quality calculating means for determining signal quality of each of a plurality of the OFDM signals after the distortion correction; and selecting means for selecting one OFDM signal from the plurality of the OFDM signals after the distortion correction on a basis of the signal quality; wherein a pass band of at least one of the plurality of the interpolating filters is a plurality of bands.

According to the second embodiment of the present invention, there is provided a signal processing method wherein when a receiving device for receiving an OFDM (Orthogonal Frequency Division Multiplexing) signal in which a pilot signal is arranged at a plurality of predetermined positions extracts the pilot signal from the OFDM signal, estimates transmission line characteristics as characteristics of a transmission line of the OFDM signal with respect to the pilot signal using the pilot signal and outputs transmission line characteristic data indicating the transmission line characteristics, estimates the transmission line characteristics in which interpolation in a time direction is performed using the transmission line characteristic data with respect to the pilot signal and outputs transmission line characteristic data indicating the transmission line characteristics, estimates a plurality of the transmission line characteristics in which interpolation in a frequency direction is performed by filtering the transmission line characteristic data indicating the transmission line characteristics in which interpolation in the time direction is performed by each of a plurality of interpolating filters having different pass bands and outputs pieces of transmission line characteristic data indicating the transmission line characteristics, corrects distortion of the OFDM signal using each of the pieces of transmission line characteristic data indicating the plurality of the transmission line characteristics in which interpolation in the frequency direction is performed, determines signal quality of each of a plurality of the OFDM signals after the distortion correction, and selects one OFDM signal from the plurality of the OFDM signals after the distortion correction on a basis of the signal quality, a pass band of at least one of the plurality of the interpolating filters is a plurality of bands.

In the second embodiment as described above, the pilot signal is extracted from the OFDM signal, transmission line characteristics as characteristics of a transmission line of the OFDM signal with respect to the pilot signal are estimated using the pilot signal, and transmission line characteristic data indicating the transmission line characteristics is output. Further, the transmission line characteristics in which interpolation in a time direction is performed are estimated using the transmission line characteristic data with respect to the pilot signal, and transmission line characteristic data indicating the transmission line characteristics is output. In addition, a plurality of the transmission line characteristics in which interpolation in a frequency direction is performed are estimated by filtering the transmission line characteristic data indicating the transmission line characteristics in which interpolation in the time direction is performed by each of a plurality of interpolating filters having different pass bands, and pieces of transmission line characteristic data indicating the transmission line characteristics are output. Then, distortion of the OFDM signal is corrected using each of the pieces of transmission line characteristic data indicating the plurality of the transmission line characteristics in which interpolation in the frequency direction is performed, and signal quality of each of a plurality of the OFDM signals after the distortion correction is determined. Further, one OFDM signal is selected from the plurality of the OFDM signals after the distortion correction on a basis of the signal quality. In this case, a pass band of at least one of the plurality of the interpolating filters is a plurality of bands.

Incidentally, the receiving device may be an independent device, or may be an internal block forming one device.

In addition, the program can be provided by being transmitted via a transmission medium or in a state of being recorded on a recording medium.

According to the first and second embodiments of the present invention, it is possible to prevent degradation in transmission line characteristic estimating accuracy.

DETAILED DESCRIPTION OF THE PREFERRED EMBODIMENTS

Figure 10:
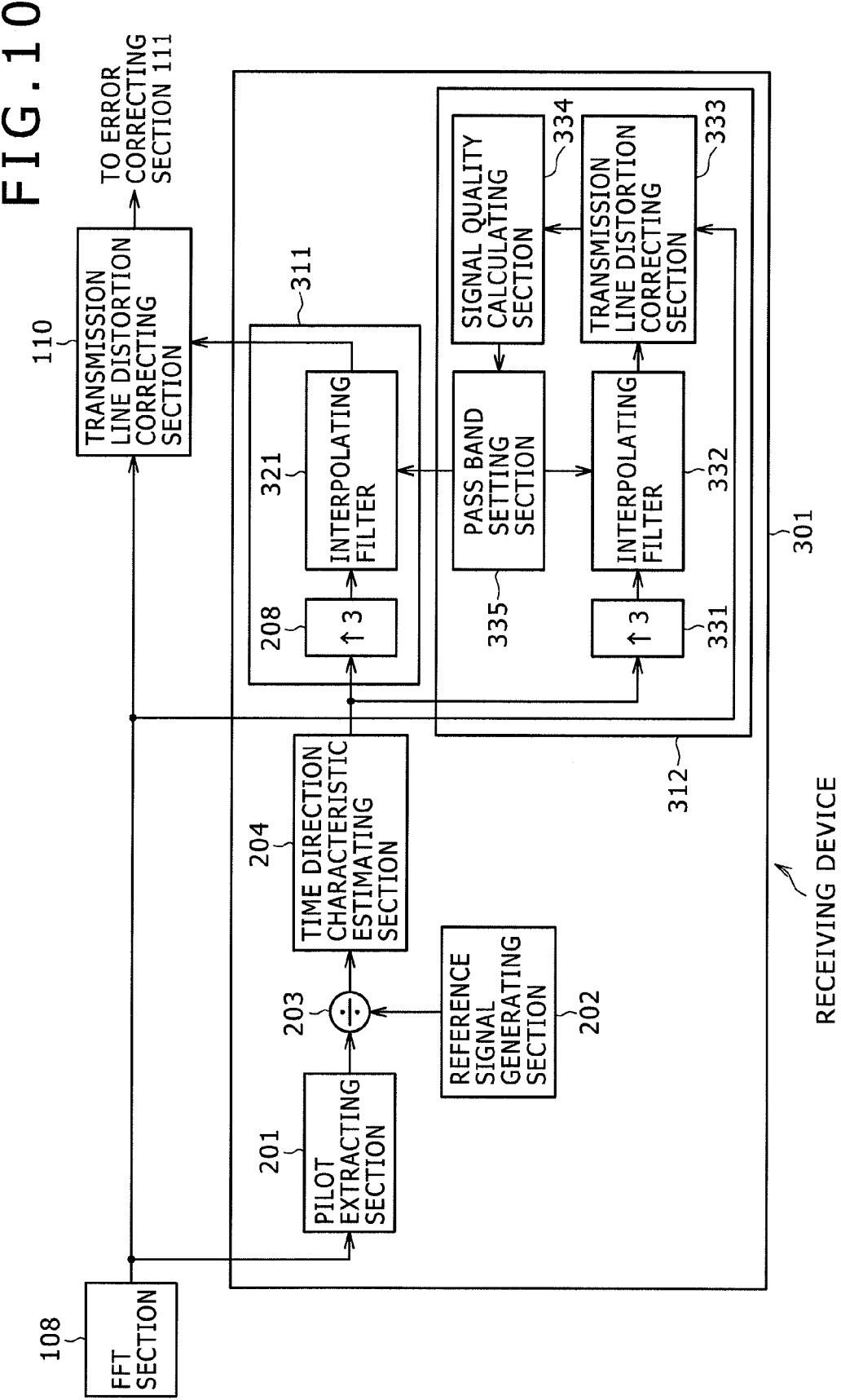
FIG. 10 is a block diagram showing an example of configuration of a first embodiment of a receiving device to which the present invention is applied.

FIG. 10 is a block diagram showing an example of configuration of a first embodiment of a receiving device to which the present invention is applied.

Figure 1:
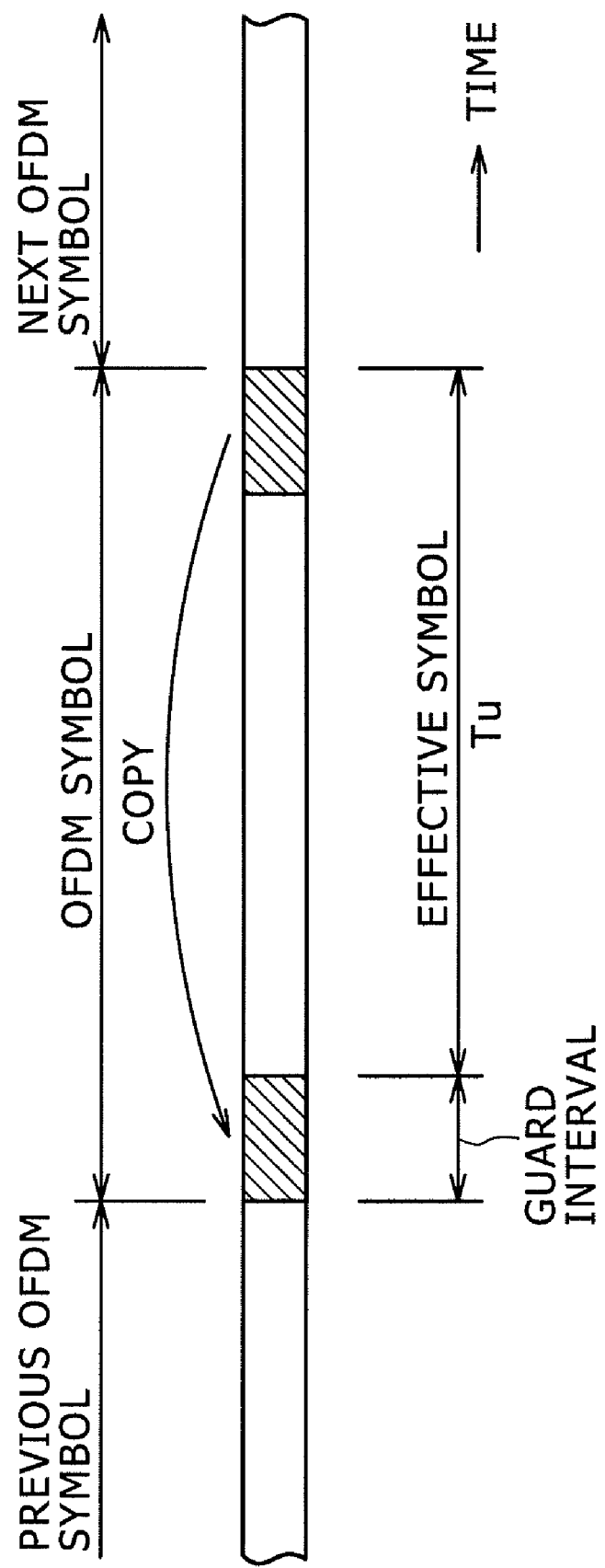
FIG. 1 is a diagram of assistance in explaining an OFDM symbol.
Figure 2:
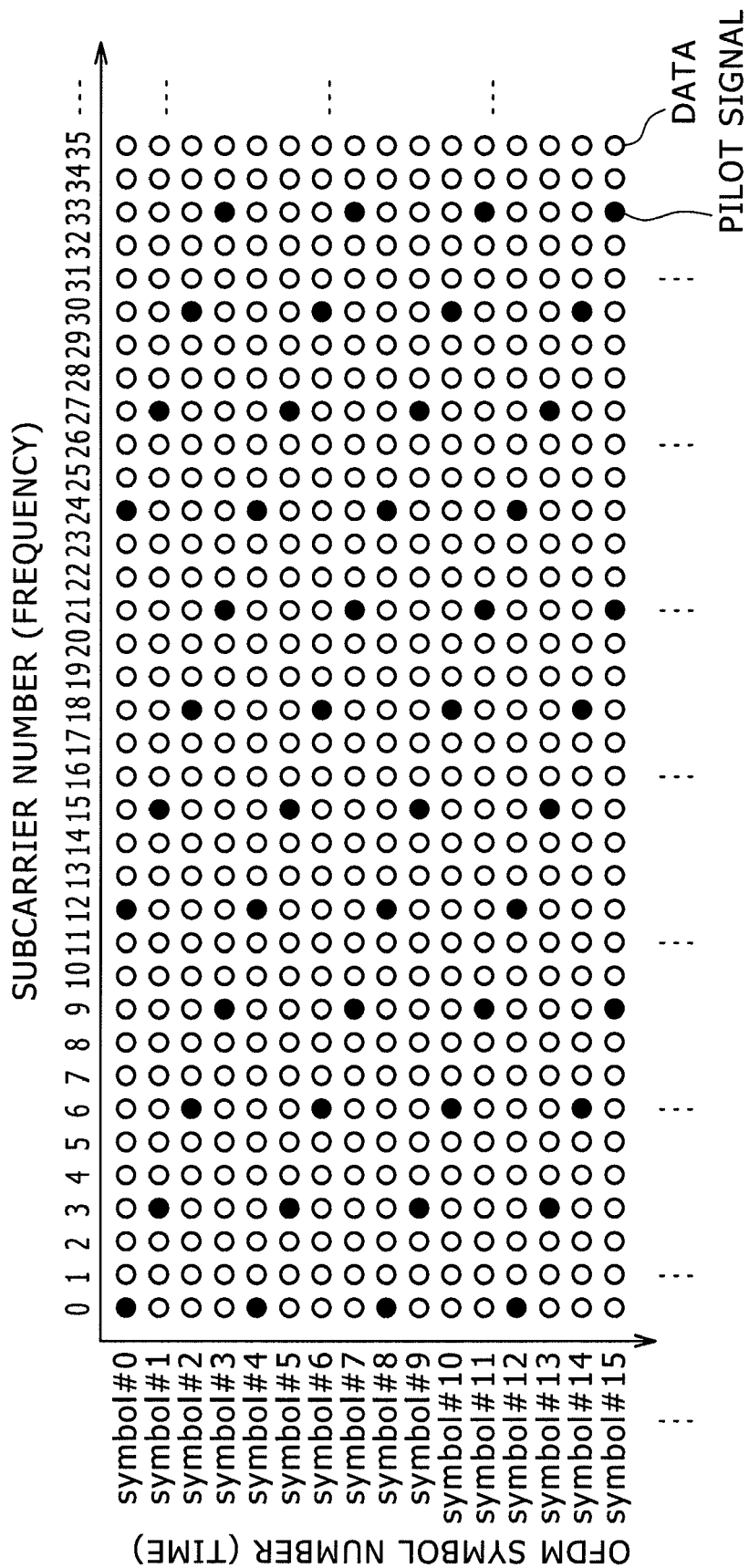
FIG. 2 is a diagram showing an arrangement pattern of pilot signals within OFDM symbols.
Figure 3:
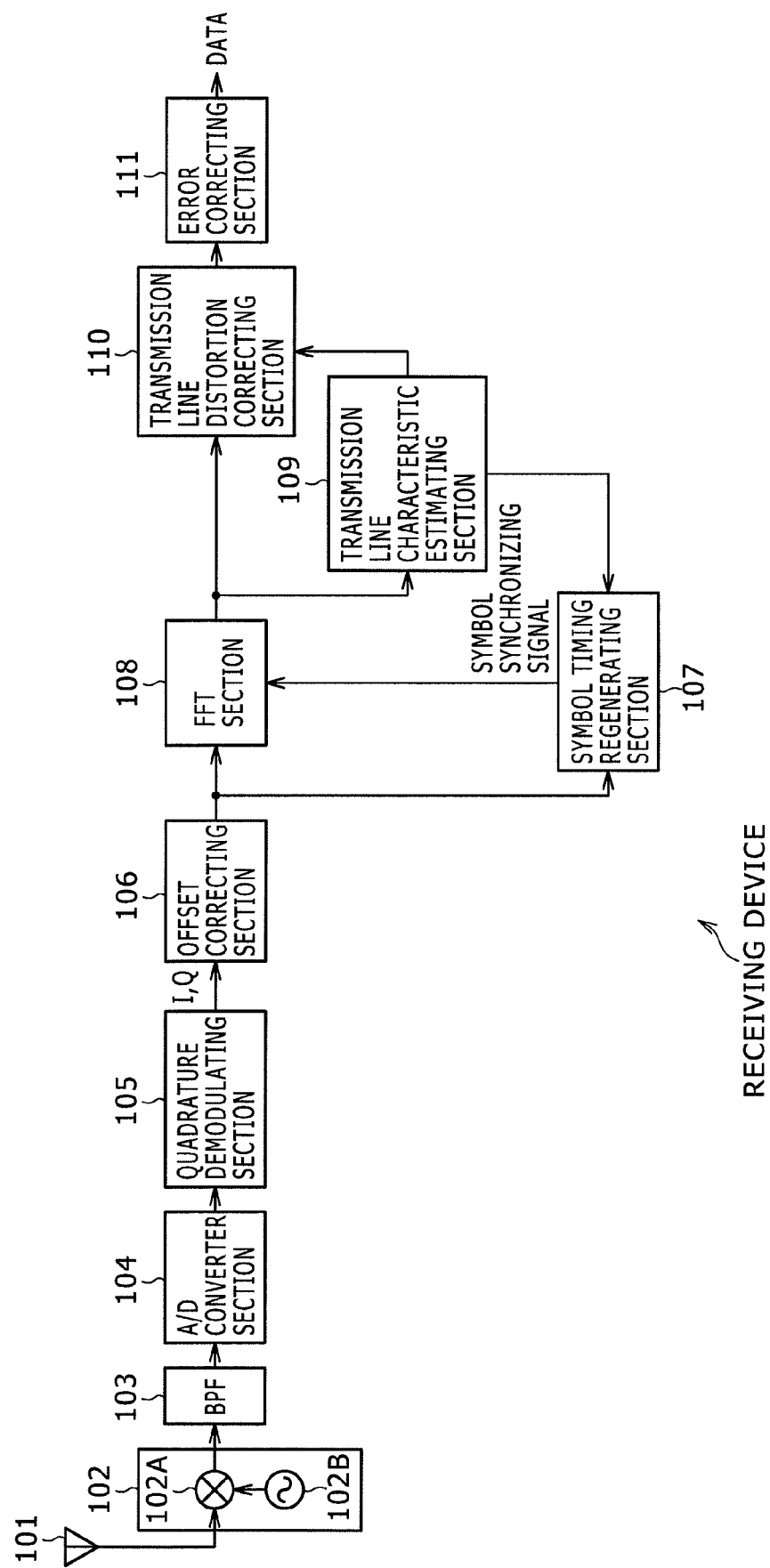
FIG. 3 is a block diagram showing a configuration of an example of a related receiving device.
Figure 4:
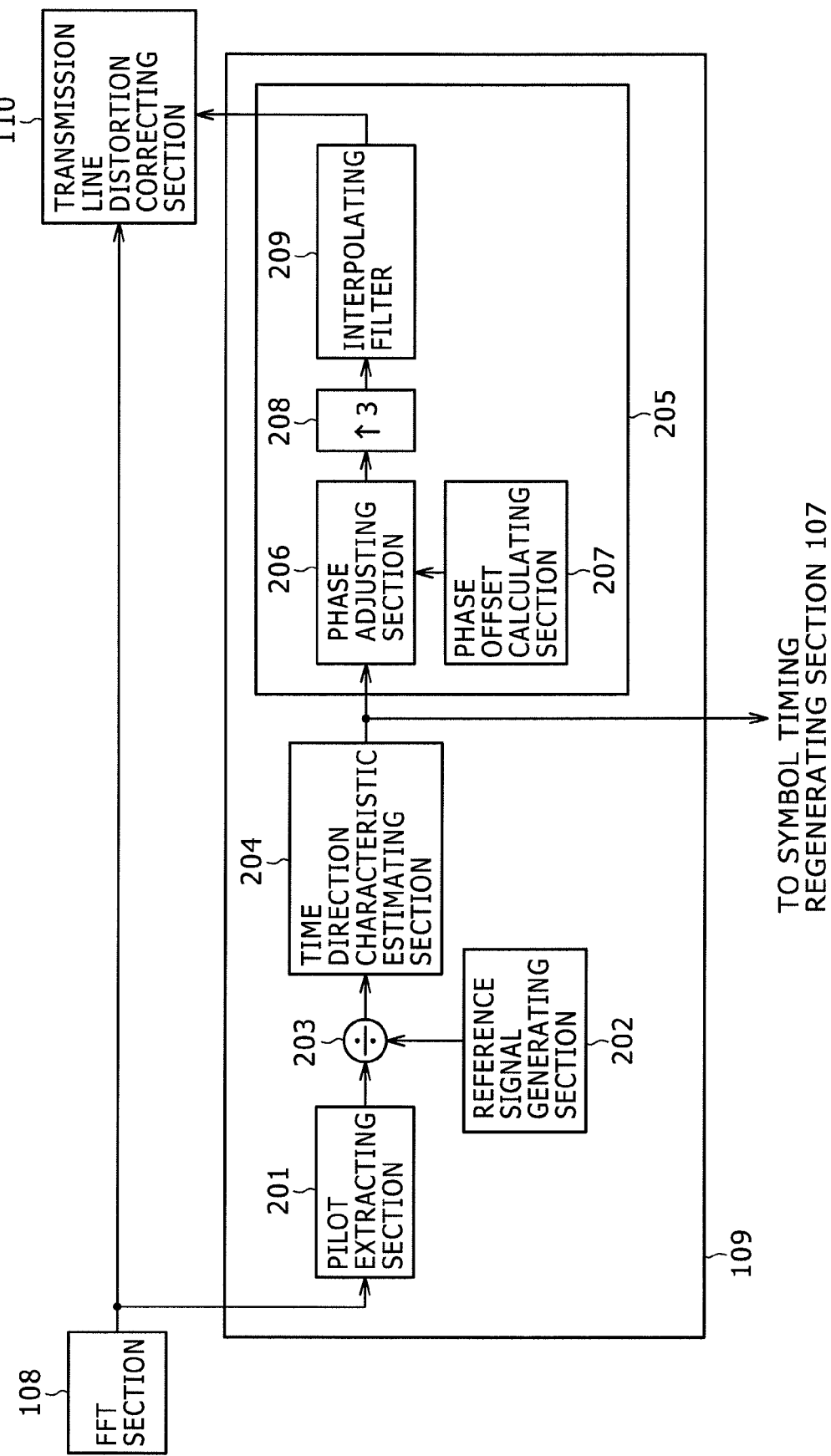
FIG. 4 is a block diagram showing an example of configuration of a transmission line characteristic estimating section.
Figure 5:
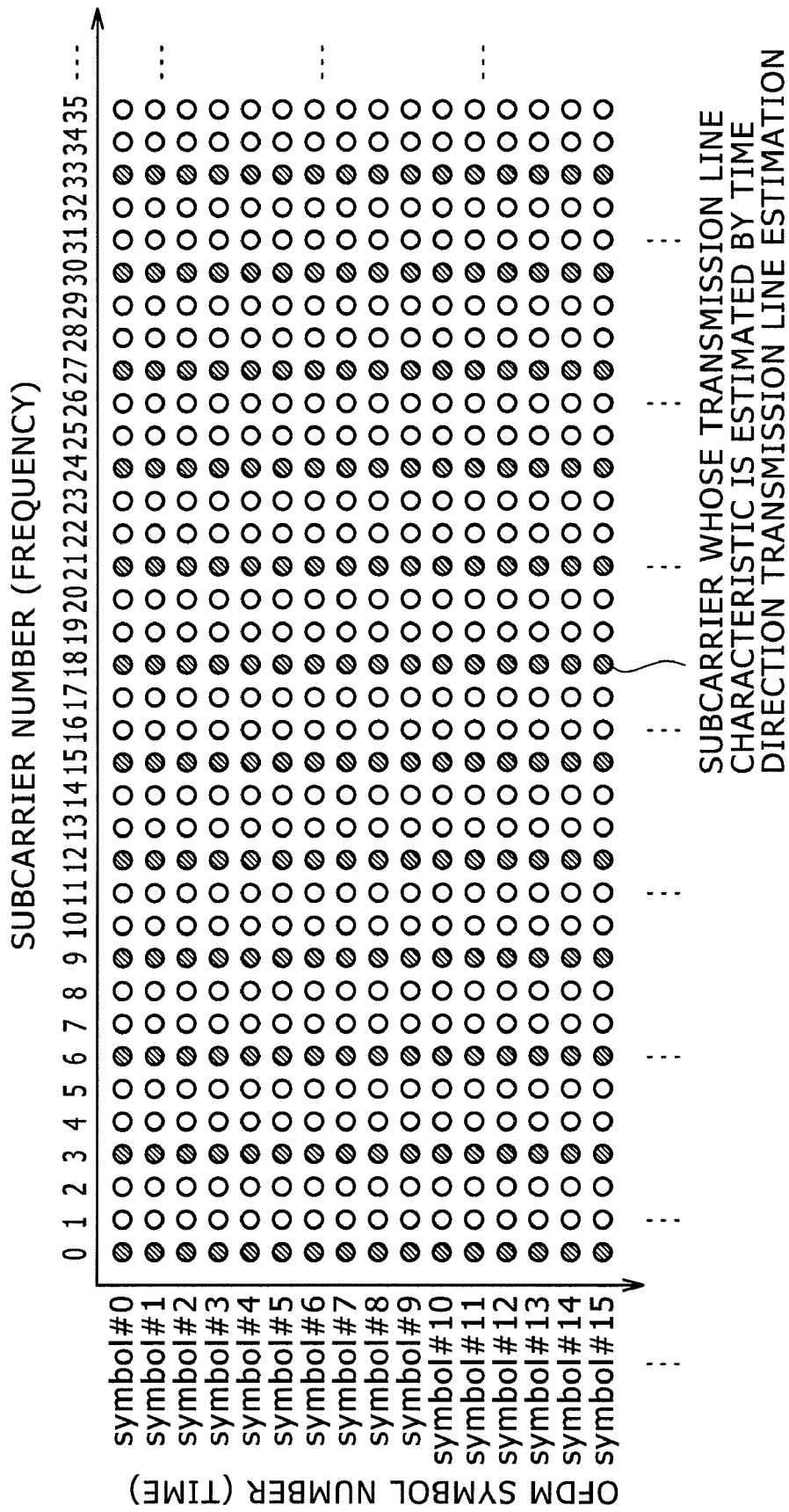
FIG. 5 is a diagram of assistance in explaining time direction interpolation characteristic data indicating transmission line characteristics in which interpolation in a time direction is performed.
Figure 6:
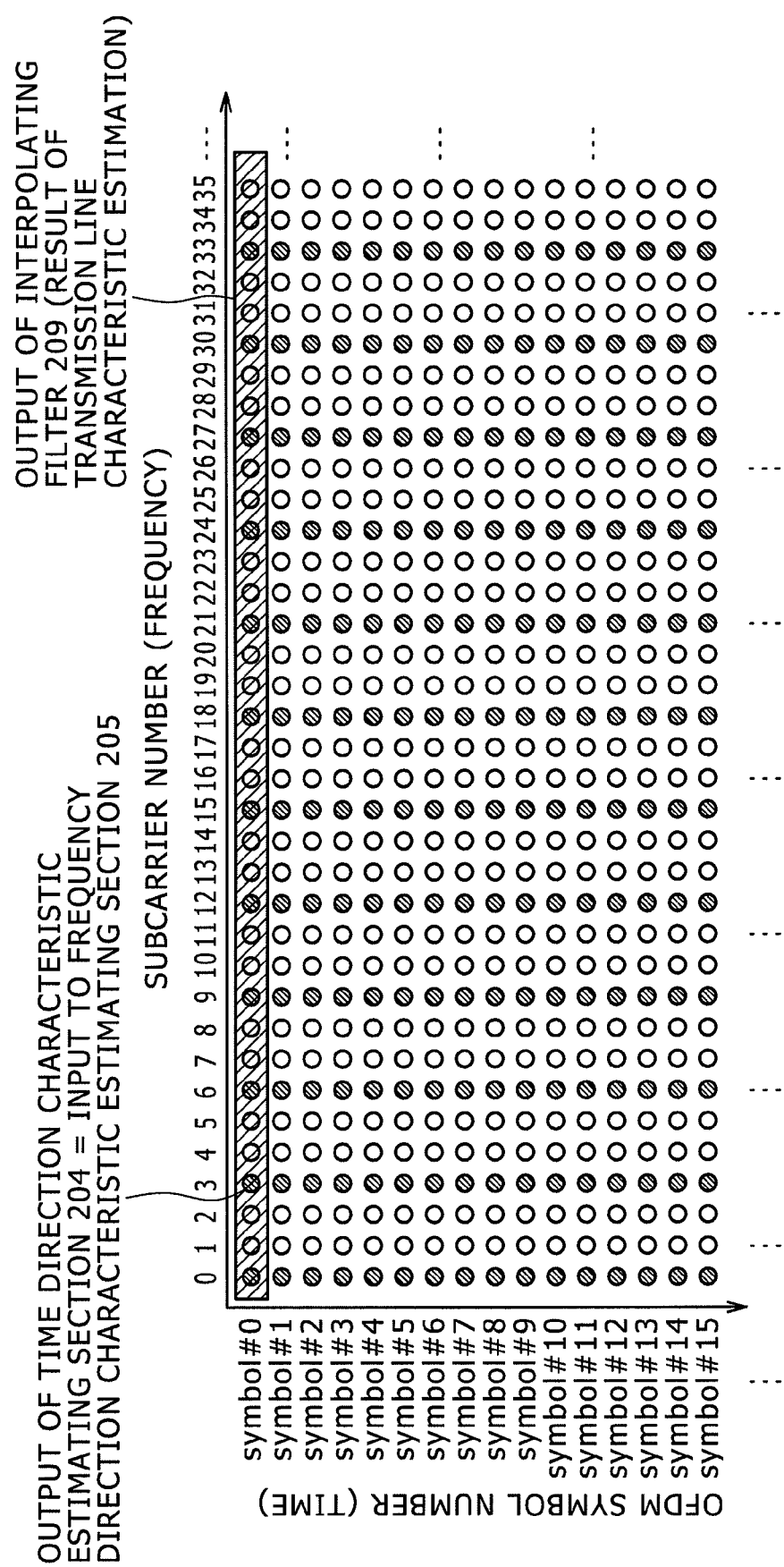
FIG. 6 is a diagram of assistance in explaining frequency direction interpolation characteristic data indicating transmission line characteristics in which interpolation in a frequency direction is performed.

Incidentally, in FIG. 10, parts corresponding to those of the receiving device of FIG. 3 and FIG. 4 are identified by the same reference numerals, and description thereof will be omitted below as appropriate.

In addition, the antenna 101, the tuner 102, the BPF 103, the A/D converter section 104, the quadrature demodulating section 105, the offset correcting section 106, the symbol timing regenerating section 107, and the error correcting section 111 in FIG. 3 are not shown in FIG. 10.

The receiving device in FIG. 10 is formed in the same manner as in FIG. 3 except that the receiving device in FIG. 10 is provided with a transmission line characteristic estimating section 301 in place of the transmission line characteristic estimating section 109.

The transmission line characteristic estimating section 301 has commonalities with the transmission line characteristic estimating section 109 in FIG. 4 in that the transmission line characteristic estimating section 301 is provided with a pilot extracting section 201, a reference signal generating section 202, an arithmetic section 203, and a time direction characteristic estimating section 204.

However, the transmission line characteristic estimating section 301 is different from the transmission line characteristic estimating section 109 in FIG. 4 in that the transmission line characteristic estimating section 301 is provided with a frequency direction characteristic estimating section 311 in place of the frequency direction characteristic estimating section 205 (FIG. 4) and is newly provided with a filter controlling section 312.

The frequency direction characteristic estimating section 311 is supplied with time direction interpolation characteristic data from the time direction characteristic estimating section 204.

The frequency direction characteristic estimating section 311 filters the time direction interpolation characteristic data from the time direction characteristic estimating section 204 by an interpolating filter 321 used for interpolation. The frequency direction characteristic estimating section 311 thereby estimates transmission line characteristics in which interpolation is performed in a frequency direction. The frequency direction characteristic estimating section 311 outputs transmission line characteristic data (frequency direction interpolation characteristic data) indicating the transmission line characteristics.

Specifically, the frequency direction characteristic estimating section 311 includes an upsampling section 208 and the interpolating filter 321.

As in the case of FIG. 4, the upsampling section 208 interpolates two zeros between sample values of the time direction interpolation characteristic data supplied from the time direction characteristic estimating section 204, and supplies zero-value interpolation characteristic data obtained as a result to the interpolating filter 321.

The interpolating filter 321 is a filter whose pass band is variable according to control of the filter controlling section 312. The interpolating filter 321 obtains transmission line characteristic data (frequency direction interpolation characteristic data) indicating transmission line characteristics in which interpolation is performed in a frequency direction by filtering the zero-value interpolation characteristic data from the upsampling section 208. The interpolating filter 321 supplies the transmission line characteristic data to a transmission line distortion correcting section 110.

The filter controlling section 312 controls the pass band of the interpolating filter 321. As the control of the pass band of the interpolating filter 321, it is possible not only to control the bandwidth and position (phase) of the pass band of the interpolating filter 321 but also to perform control so as to make the pass band of the interpolating filter 321 one band and control so as to make the pass band of the interpolating filter 321 a plurality of bands such as two bands.

Specifically, the filter controlling section 312 includes an upsampling section 331, an interpolating filter 332, a transmission line distortion correcting section 333, a signal quality calculating section 334, and a pass band setting section 335.

The upsampling section 331 is supplied with the time direction interpolation characteristic data from the time direction characteristic estimating section 204. As with the upsampling section 208, the upsampling section 331 interpolates two zeros between sample values of the time direction interpolation characteristic data supplied from the time direction characteristic estimating section 204, and supplies zero-value interpolation characteristic data obtained as a result to the interpolating filter 332.

The interpolating filter 332 is supplied with the zero-value interpolation characteristic data from the upsampling section 331, and is also supplied with a coefficient from the pass band setting section 335.

The interpolating filter 332 obtains frequency direction interpolation characteristic data by filtering the zero-value interpolation characteristic data from the upsampling section 331 using the coefficient from the pass band setting section 335 as a filter coefficient. The interpolating filter 332 outputs the frequency direction interpolation characteristic data to the transmission line distortion correcting section 333.

The transmission line distortion correcting section 333 is supplied with the frequency direction interpolation characteristic data from the interpolating filter 332, and is also supplied with an OFDM frequency domain signal output by an FFT section 108.

The transmission line distortion correcting section 333 corrects distortion of the OFDM frequency domain signal from the FFT section 108 using the frequency direction interpolation characteristic data from the interpolating filter 332. The transmission line distortion correcting section 333 supplies the OFDM frequency domain signal after the distortion correction to the signal quality calculating section 334.

The signal quality calculating section 334 determines signal quality of the OFDM frequency domain signal after the distortion correction from the transmission line distortion correcting section 333. The signal quality calculating section 334 supplies the signal quality to the pass band setting section 335.

In this case, an MER (Modulation Error Ratio), for example, can be adopted as the signal quality of the OFDM frequency domain signal after the distortion correction. The MER is inversely proportional to a distance (average value of the distance) between a point on the IQ constellation of the OFDM frequency domain signal after the distortion correction (pilot signal of the OFDM frequency domain signal) and an original point on the IQ constellation of the OFDM frequency domain signal (pilot signal of the OFDM frequency domain signal). The larger the value of the MER, the better the signal quality indicated by the MER.

The pass band setting section 335 sets a band as the pass band of the interpolating filter 332, determines the filter coefficient of a filter having the set band as a pass band, and supplies the filter coefficient to the interpolating filter 332. The pass band setting section 335 thereby controls the pass band of the interpolating filter 332.

In addition, the pass band setting section 335 supplies the filter coefficient to the interpolating filter 321 in the frequency direction characteristic estimating section 311 in response to the signal quality supplied from the signal quality calculating section 334 and the like. The pass band setting section 335 thereby controls the pass band of the interpolating filter 321.

The control of the pass band of the interpolating filters 321 and 332 by the pass band setting section 335 in the filter controlling section 312 in FIG. 10 will next be described with reference to FIGS. 11 to 13.

The pass band setting section 335 sets one band as the pass band, and also sets a plurality of bands as the pass band.

Figure 7:
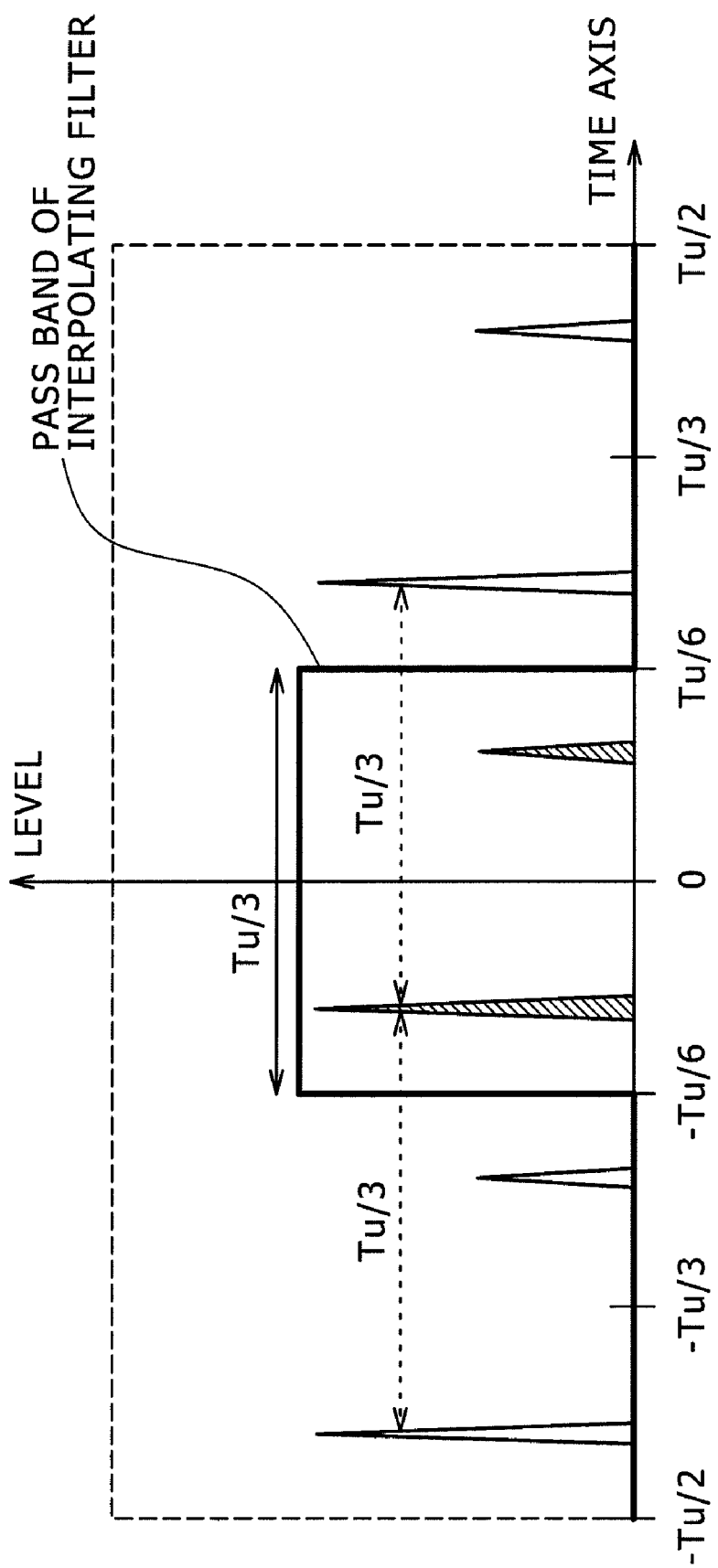
FIG. 7 is a diagram showing data in a time domain of zero-value interpolation characteristic data.
Figure 8:
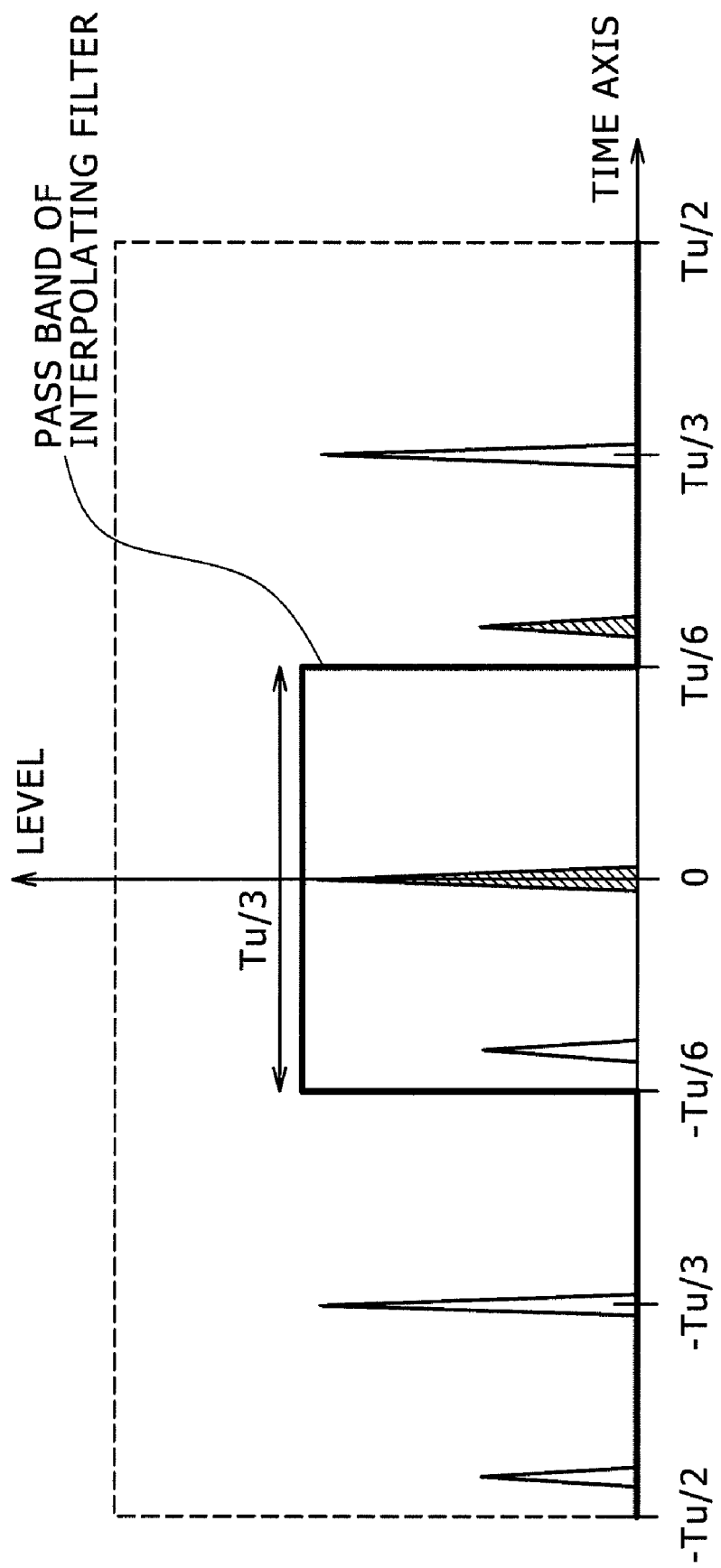
FIG. 8 is a diagram showing zero-value interpolation characteristic data obtained from time direction interpolation characteristic data whose phase is not adjusted.
Figure 9:
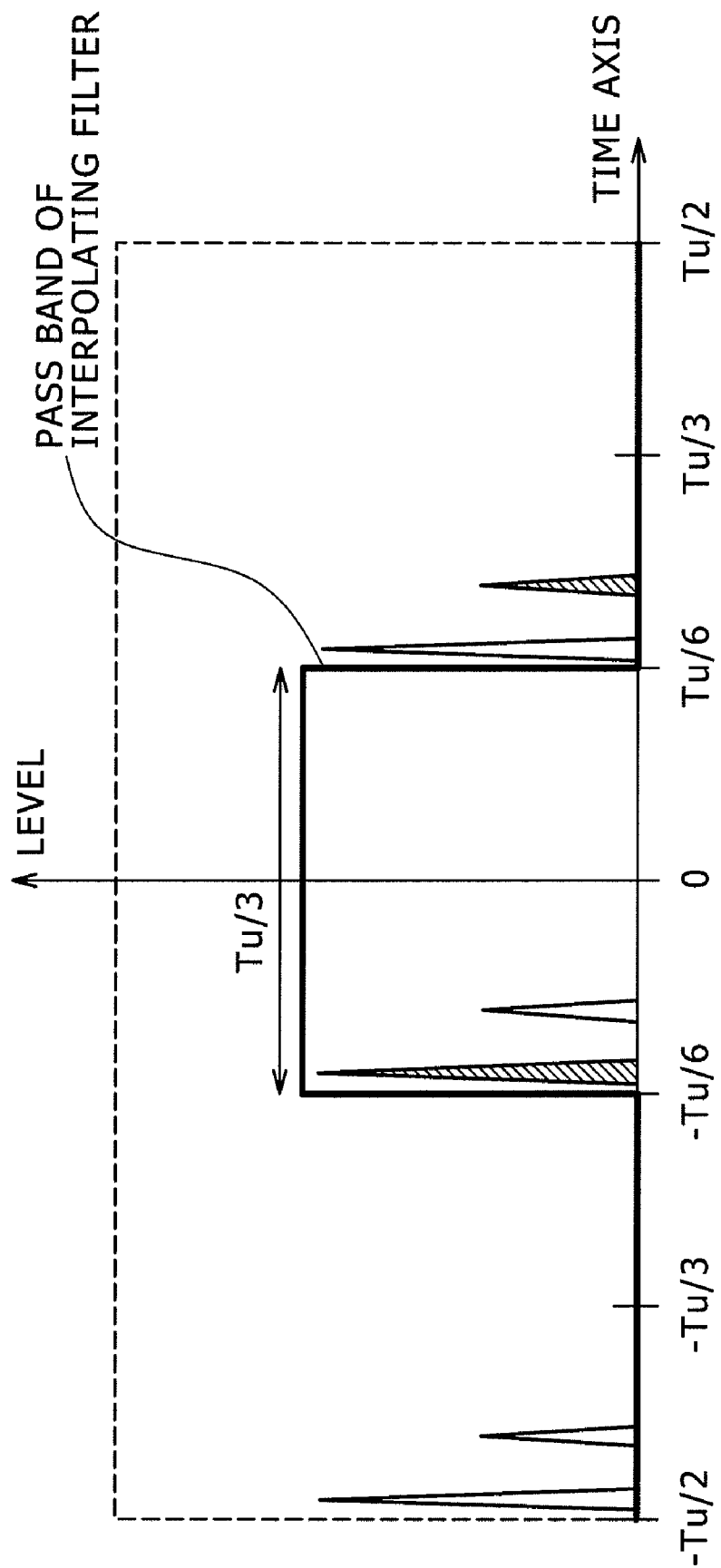
FIG. 9 is a diagram showing zero-value interpolation characteristic data when a maximum delay time of a multipath exceeds Tu/3 [seconds]

Specifically, the pass band setting section 335 can set one band as the pass band as with the pass band of the interpolating filter 209 (FIG. 4) which pass band is shown in FIGS. 7 to 9.

Further, the pass band setting section 335 can set a plurality of bands such as two bands as the pass band.

Figure 11:
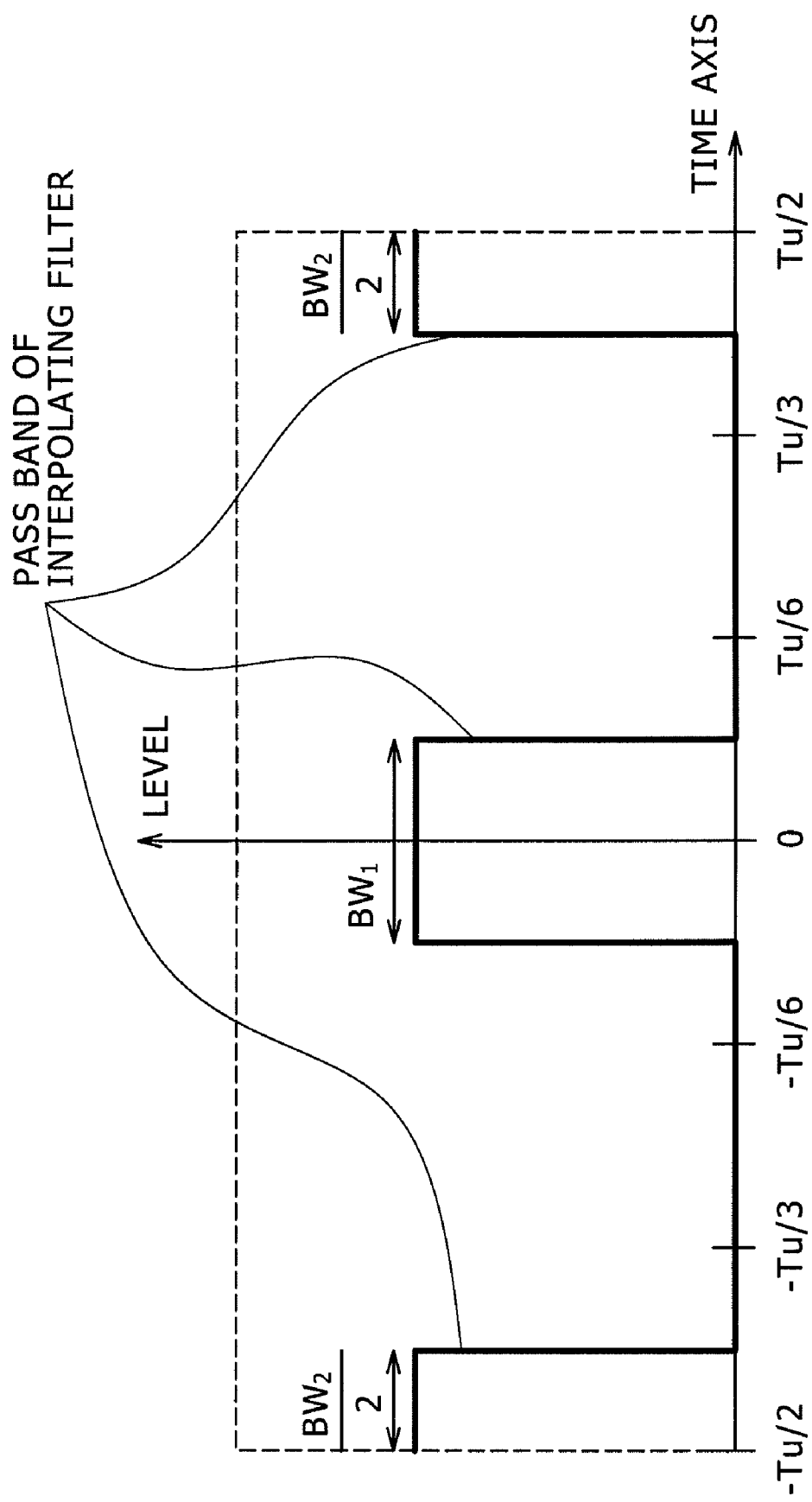
FIG. 11 is a diagram showing a window function as characteristic of a filter having two bands as pass band.

Specifically, FIG. 11 shows a window function as characteristic of a filter having two bands as pass band.

As shown in FIG. 11, the pass band setting section 335 (FIG. 10) can set two bands of a low-frequency band and a high-frequency band as the pass band.

Incidentally, in FIG. 11, the low-frequency bandwidth is $BW_1$, and the high-frequency bandwidth is $BW_2$.

In addition, in FIG. 11, the high-frequency band appears to be two bands with ½ of the bandwidth $BW_2$ of the high-frequency band folded back, as it were, from a +Tu/2 side to a −Tu/2 side (or from the −Tu/2 side to the +Tu/2 side). However, the high-frequency band is in effect one band.

Figure 12:
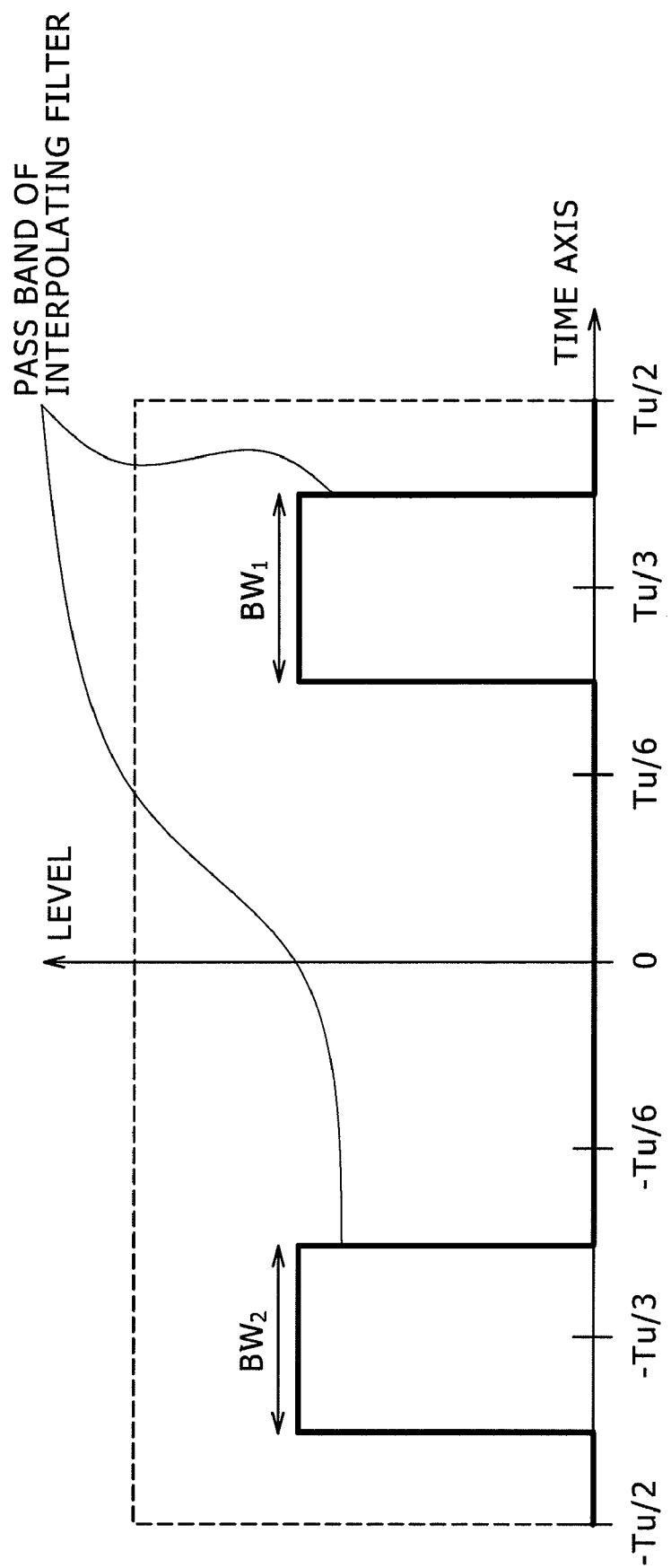
FIG. 12 is a diagram showing a window function as characteristic of another filter having two bands as pass band.

FIG. 12 shows a window function as characteristic of another filter having two bands as pass band.

As shown in FIG. 12, the pass band setting section 335 (FIG. 10) can set two medium-frequency bands as the pass band.

Incidentally, in FIG. 12, the bandwidths of the two medium-frequency bands are $BW_1$ and $BW_2$, respectively.

The pass band (window function) of FIG. 11 and the pass band of FIG. 12 are different from each other only in position (phase). That is, when the position of one of the pass band of FIG. 11 and the pass band of FIG. 12 is shifted, the pass band shifted in position coincides with the other pass band.

In this case, the pass band setting section 335 not only can set two bands as the pass band but also can set three or more bands as the pass band.

However, because an aliasing component (multipath other than a desired multipath) needs to be removed in filtering the zero-value interpolation characteristic data, a total of bandwidth of the pass band needs to be equal to or less than the cycle Tu/N of the time direction interpolation characteristic data.

That is, for example, for OFDM signals of the ISDB-T and DVB-T standards, the bandwidths $BW_1$ and $BW_2$ in FIG. 11 and FIG. 12 need to satisfy an equation $BW_1+BW_2 \leq Tu/3$ as a constraint condition.

Figure 13:
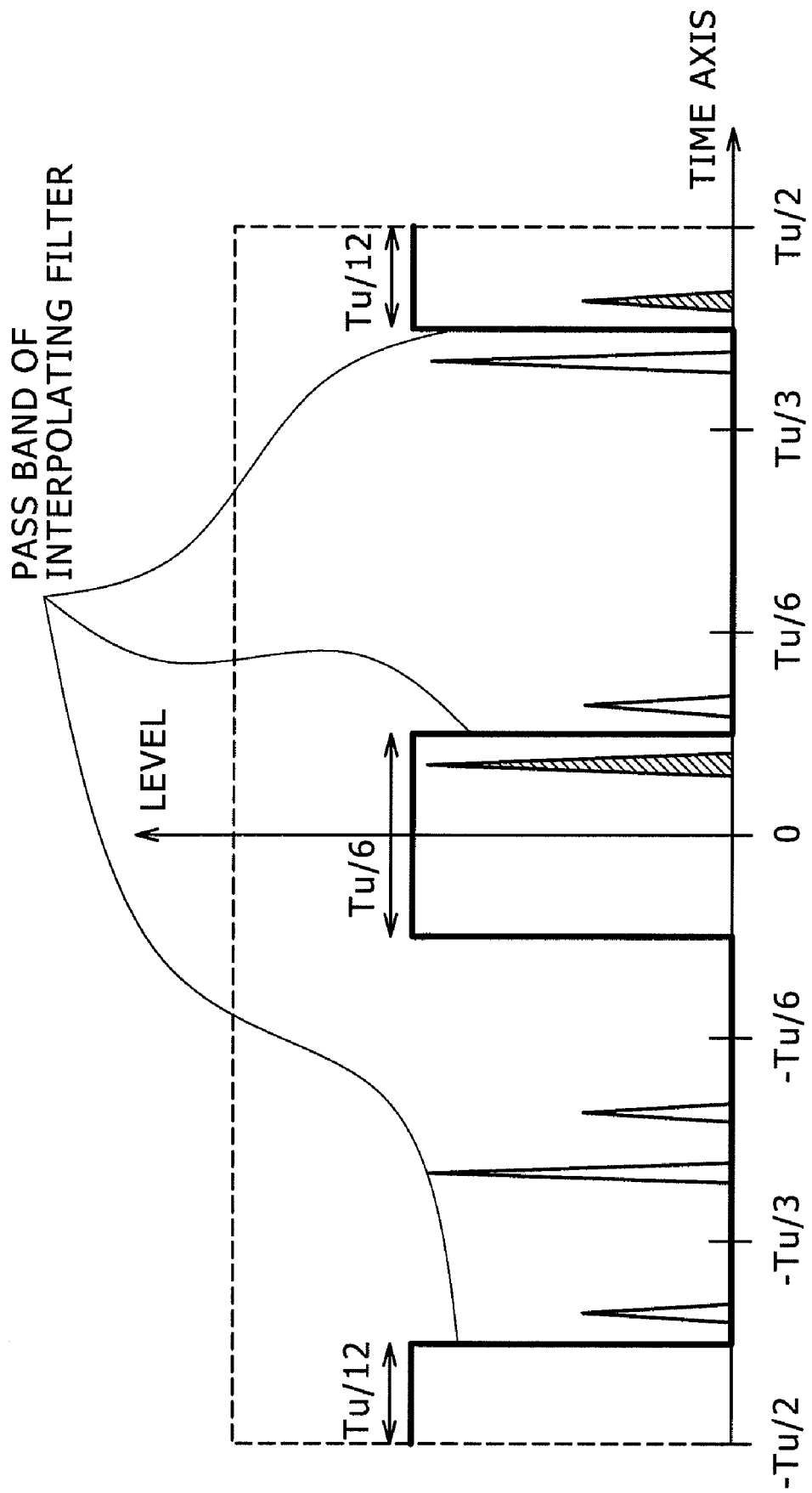
FIG. 13 is a diagram showing a window function as characteristic of a filter having a pass band of bandwidths $BW_1$ and $BW_2$ satisfying a constraint condition.

FIG. 13 shows a window function as characteristic of a filter having a pass band of bandwidths $BW_1$ and $BW_2$ satisfying the constraint condition for OFDM signals of the ISDB-T and DVB-T standards.

The pass band (window function) of FIG. 13 is obtained by making each of the bandwidths $BW_1$ and $BW_2$ of the pass band of FIG. 11 Tu/6.

According to the filter having the pass band of FIG. 13, when the maximum delay time of a multipath exceeds the cycle Tu/3 [seconds] of the time direction interpolation characteristic data, all paths of a desired multipath (shown by hatching in FIG. 13) can be included in the pass band and other multipaths can be prevented from being included in the pass band by adjusting the position (phase) of the pass band.

As described above, the pass band setting section 335 can set not only one band but also a plurality of bands as the pass band of the interpolating filters 321 and 332. Therefore, even when multipaths are long-delay multipaths exceeding the cycle Tu/3 [seconds] of the time direction interpolation characteristic data, the interpolating filter 321 (FIG. 10) can extract only a desired multipath. As a result, degradation in transmission line characteristic estimating accuracy can be prevented.

A process performed after the FFT operation of the FFT section 108 in the receiving device of FIG. 10 will next be described with reference to FIG. 14.

An OFDM frequency domain signal obtained by the FFT operation in the FFT section 108 is supplied to the transmission line distortion correcting sections 110 and 333 and the pilot extracting section 201.

The pilot extracting section 201 in step S11 extracts a pilot signal from the OFDM frequency domain signal from the FFT section 108, and then supplies the pilot signal to the arithmetic section 203. The process proceeds to step S12.

In step S12, using the pilot signal from the pilot extracting section 201, the arithmetic section 203 estimates transmission line characteristics with respect to the pilot signal. The arithmetic section 203 outputs transmission line characteristic data indicating the transmission line characteristics to the time direction characteristic estimating section 204. The process proceeds to step S13.

Specifically, the arithmetic section 203 is supplied with the pilot signal from the pilot extracting section 201 and is also supplied with a reference signal from the reference signal generating section 202.

The arithmetic section 203 obtains the transmission line characteristic data indicating the transmission line characteristics with respect to the pilot signal by dividing the pilot signal from the pilot extracting section 201 by the reference signal from the reference signal generating section 202. The arithmetic section 203 supplies the transmission line characteristic data to the time direction characteristic estimating section 204.

The time direction characteristic estimating section 204 in step S13 estimates transmission line characteristics in which interpolation in a time direction is performed using the transmission line characteristic data indicating the transmission line characteristics with respect to the pilot signal from the arithmetic section 203. The time direction characteristic estimating section 204 outputs transmission line characteristic data indicating the transmission line characteristics (time direction interpolation characteristic data) to the upsampling section 208 in the frequency direction characteristic estimating section 311 and the filter controlling section 312 (upsampling section 331 in the filter controlling section 312). The process proceeds to step S14.

In step S14, the upsampling section 208 in the frequency direction characteristic estimating section 311 obtains zero-value interpolation characteristic data by performing upsampling that interpolates zeros in the time direction interpolation characteristic data from the time direction characteristic estimating section 204. The upsampling section 208 supplies the zero-value interpolation characteristic data to the interpolating filter 321. The process proceeds to step S15.

In step S15, the filter controlling section 312 performs a pass band controlling process that controls the pass band of the interpolating filter 321 using the time direction interpolation characteristic data from the time direction characteristic estimating section 204. The process then proceeds to step S16.

In step S16, the interpolating filter 321 estimates transmission line characteristics in which interpolation in the frequency direction is performed by subjecting the zero-value interpolation characteristic data from the upsampling section 208 to filtering that extracts a signal in the pass band according to control from the filter controlling section 312.

That is, the interpolating filter 321 obtains transmission line characteristic data indicating the transmission line characteristics in which interpolation in the frequency direction is performed (frequency direction interpolation characteristic data) by filtering the zero-value interpolation characteristic data from the upsampling section 208.

Then, the interpolating filter 321 supplies the frequency direction interpolation characteristic data to the transmission line distortion correcting section 110. The process proceeds from step S16 to step S17.

In step S17, the transmission line distortion correcting section 110 corrects distortion of the OFDM frequency domain signal from the FFT section 108 using the frequency direction interpolation characteristic data from the interpolating filter 321. Further, the transmission line distortion correcting section 110 supplies the OFDM frequency domain signal after the distortion correction to the error correcting section 111. The process proceeds from step S17 to step S18.

In step S18, the error correcting section 111 performs a necessary error correcting process on the OFDM frequency domain signal from the transmission line distortion correcting section 110. The error correcting section 111 thereby obtains decoded data, and outputs the decoded data.

Figure 14:
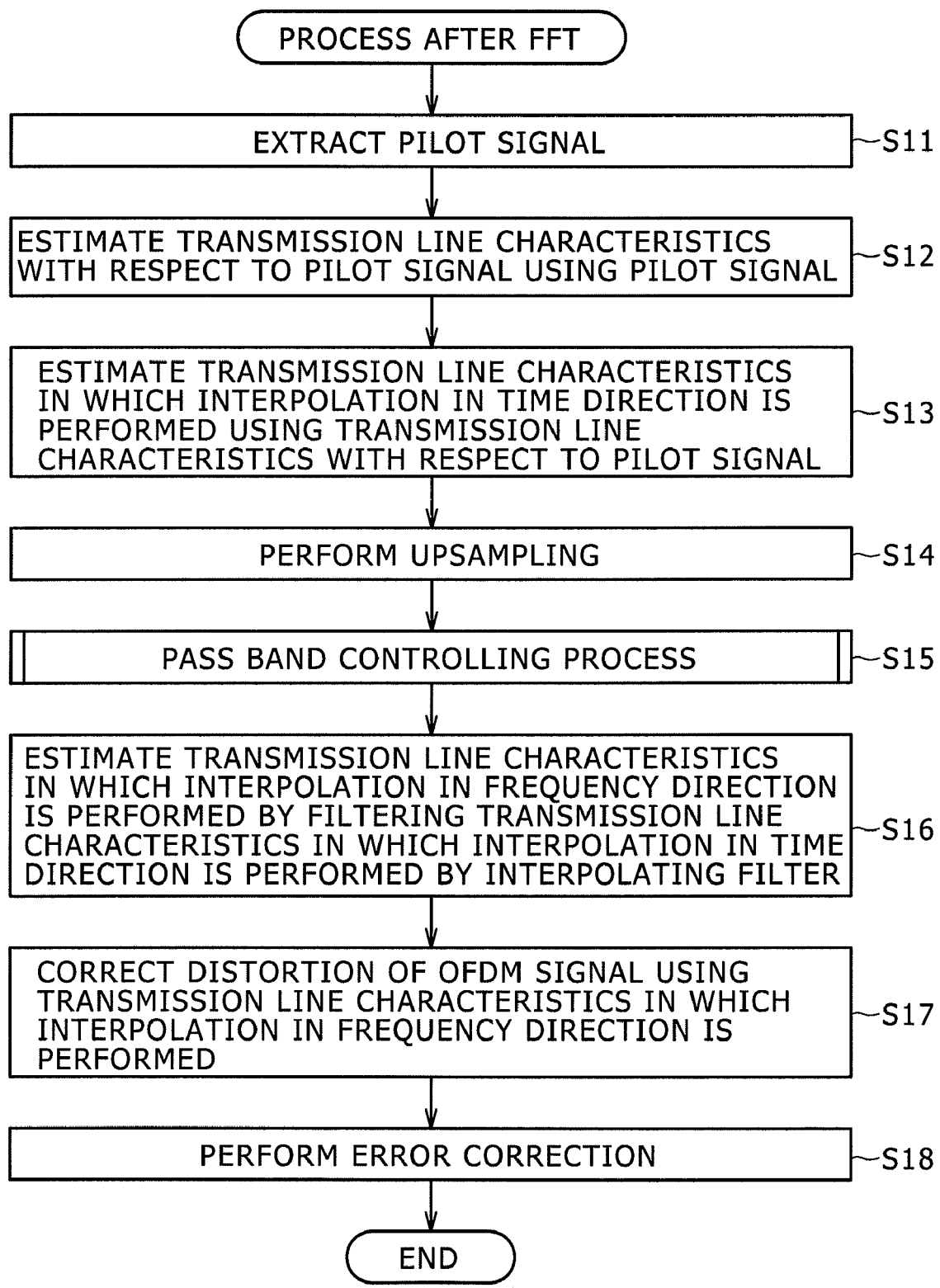
FIG. 14 is a flowchart of assistance in explaining a process performed after the FFT operation of an FFT section in the receiving device according to the first embodiment.

Incidentally, the process described with reference to the flowchart of FIG. 14 is performed in a pipeline.

Figure 15:
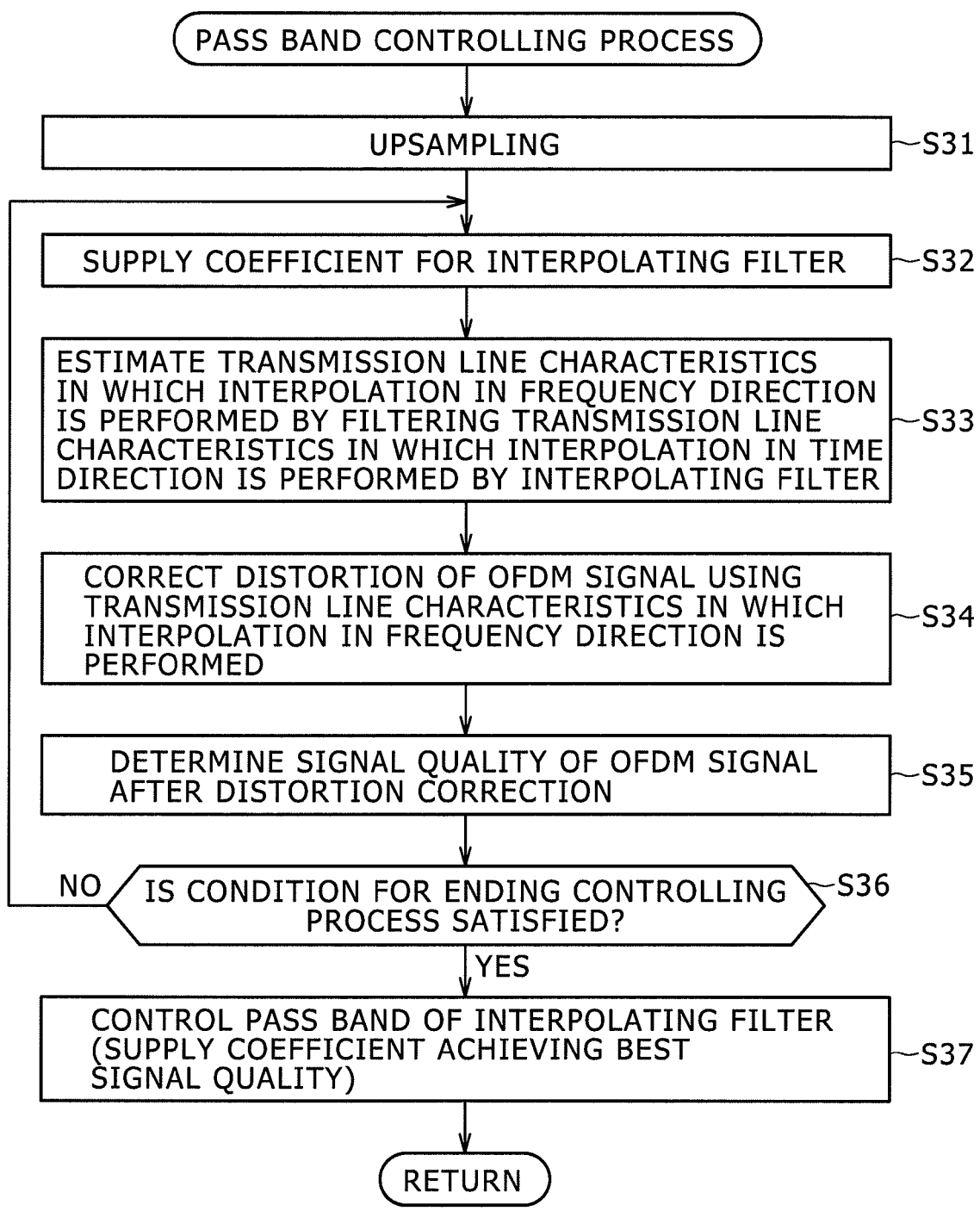
FIG. 15 is a flowchart of assistance in explaining a pass band controlling process.

The pass band controlling process performed by the filter controlling section 312 (FIG. 10) in step S15 in FIG. 14 will next be described with reference to FIG. 15.

In the pass band controlling process, the upsampling section 331 in step S31 obtains zero-value interpolation characteristic data by performing upsampling similar to that of the upsampling section 208 on the time direction interpolation characteristic data from the time direction characteristic estimating section 204. Further, the upsampling section 331 supplies the zero-value interpolation characteristic data to the interpolating filter 332. The process proceeds from step S31 to step S32.

In step S32, the pass band setting section 335 sets a band as the pass band of the interpolating filter 332, determines the filter coefficient of a filter having the set band as a pass band, and supplies the filter coefficient to the interpolating filter 332. The pass band setting section 335 thereby controls the pass band of the interpolating filter 332.

The pass band setting section 335 for example has a plurality of band candidates that are different from each other in bandwidth and position (phase) as candidates for the pass band which candidates are stored in a built-in table (hereinafter referred to also as a candidate table) (not shown).

The candidates stored in the candidate table include candidates whose pass band is a plurality of bands, as described with reference to FIGS. 11 to 13.

As described later, the process of step S32 is performed repeatedly. The pass band setting section 335 in the repeatedly performed step S32 for example sets the plurality of candidates stored in the candidate table as a band that becomes the pass band of the interpolating filter 332 in order.

After step S32, the process proceeds to step S33. The interpolating filter 332 estimates transmission line characteristics in which interpolation in the frequency direction is performed by subjecting the zero-value interpolation characteristic data from the upsampling section 331 to filtering that extracts a signal in the pass band according to control from the pass band setting section 335.

That is, the interpolating filter 332 obtains frequency direction interpolation characteristic data indicating the transmission line characteristics in which interpolation in the frequency direction is performed by filtering the zero-value interpolation characteristic data from the upsampling section 331 using the filter coefficient supplied from the pass band setting section 335.

Then, the interpolating filter 332 supplies the frequency direction interpolation characteristic data to the transmission line distortion correcting section 333. The process proceeds from step S33 to step S34.

In step S34, as with the transmission line distortion correcting section 110, the transmission line distortion correcting section 333 corrects distortion of the OFDM frequency domain signal from the FFT section 108 using the frequency direction interpolation characteristic data from the interpolating filter 332. Further, the transmission line distortion correcting section 333 supplies the OFDM frequency domain signal after the distortion correction to the signal quality calculating section 334. The process proceeds from step S34 to step S35.

In step S35, the signal quality calculating section 334 determines the signal quality of the OFDM frequency domain signal after the distortion correction from the transmission line distortion correcting section 333. The signal quality calculating section 334 supplies the signal quality to the pass band setting section 335. The pass band setting section 335 temporarily stores the signal quality from the signal quality calculating section 334 in the candidate table in association with the pass band of the interpolating filter 332 when the signal quality is obtained. The process proceeds from step S35 to step S36.

In step S36, the pass band setting section 335 determines whether a control ending condition for ending the pass band controlling process is satisfied.

In this case, for example, a condition that all candidates for the pass band which candidates are stored in the candidate table have been set as the pass band, a condition that the signal quality obtained in the signal quality calculating section 334 exceeds a predetermined quality, a condition that the setting of the pass band (process of step S32) has been performed a predetermined number of times, and the like can be adopted as the control ending condition.

When it is determined in step S36 that the control ending condition is not satisfied, the process returns to step S32 to thereafter repeat the process of steps S32 to S36.

When it is determined in step S36 that the control ending condition is satisfied, the process proceeds to step S37, where the pass band setting section 335 controls the pass band of the interpolating filter 321 (FIG. 10). The process then returns.

That is, the pass band setting section 335 for example controls the pass band of the interpolating filter 321 by supplying the interpolating filter 321 with a filter coefficient for realizing a pass band associated with best signal quality among pass bands stored in the candidate table.

As described above, the interpolating filter 321 in step S16 in FIG. 14 estimates transmission line characteristics in which interpolation in the frequency direction is performed by subjecting the zero-value interpolation characteristic data from the upsampling section 331 to filtering that extracts a signal in the pass band according to control from the pass band setting section 335.

That is, the interpolating filter 332 obtains frequency direction interpolation characteristic data indicating the transmission line characteristics in which interpolation in the frequency direction is performed by filtering the zero-value interpolation characteristic data from the upsampling section 331 using the filter coefficient supplied from the pass band setting section 335.

As described above, in the receiving device of FIG. 10, the pilot extracting section 201 extracts a pilot signal from an OFDM frequency domain signal in which the pilot signal is arranged at a plurality of predetermined positions. Further, the arithmetic section 203 estimates transmission line characteristics with respect to the pilot signal using the pilot signal, and outputs transmission line characteristic data indicating the transmission line characteristics. In addition, the time direction characteristic estimating section 204 estimates transmission line characteristics in which interpolation in the time direction is performed using the transmission line characteristic data with respect to the pilot signal, and outputs transmission line characteristic data indicating the transmission line characteristics (time direction interpolation characteristic data). Further, the frequency direction characteristic estimating section 311 estimates transmission line characteristics in which interpolation in the frequency direction is performed by filtering the time direction interpolation characteristic data by the interpolating filter 321 used for the interpolation, and outputs transmission line characteristic data indicating the transmission line characteristics (frequency direction interpolation characteristic data). Then, the transmission line distortion correcting section 110 corrects distortion of the OFDM frequency domain signal using the frequency direction interpolation characteristic data.

In this case, the filter controlling section 312 controls the pass band of the interpolating filter 321. As the control of the pass band, control that makes the pass band of the interpolating filter 321 a plurality of bands is possible.

Therefore, even in an environment where a long-delay multipath whose maximum delay time exceeds the cycle Tu/N [seconds] of the time direction interpolation characteristic data occurs, such as a single frequency network (SFN), for example, the interpolating filter 321 can extract only a desired multipath. As a result, it is possible to prevent degradation in transmission line characteristic estimating accuracy and, in turn, degradation in receiving performance.

Incidentally, the filter controlling section 312 controls the pass band of the interpolating filter 321 so as to improve the signal quality of the OFDM frequency domain signal after the distortion correction as described with reference to FIG. 15. Thereby, as a result, the interpolating filter 321 performs filtering so as to extract only a desired multipath if possible.

Figure 16:
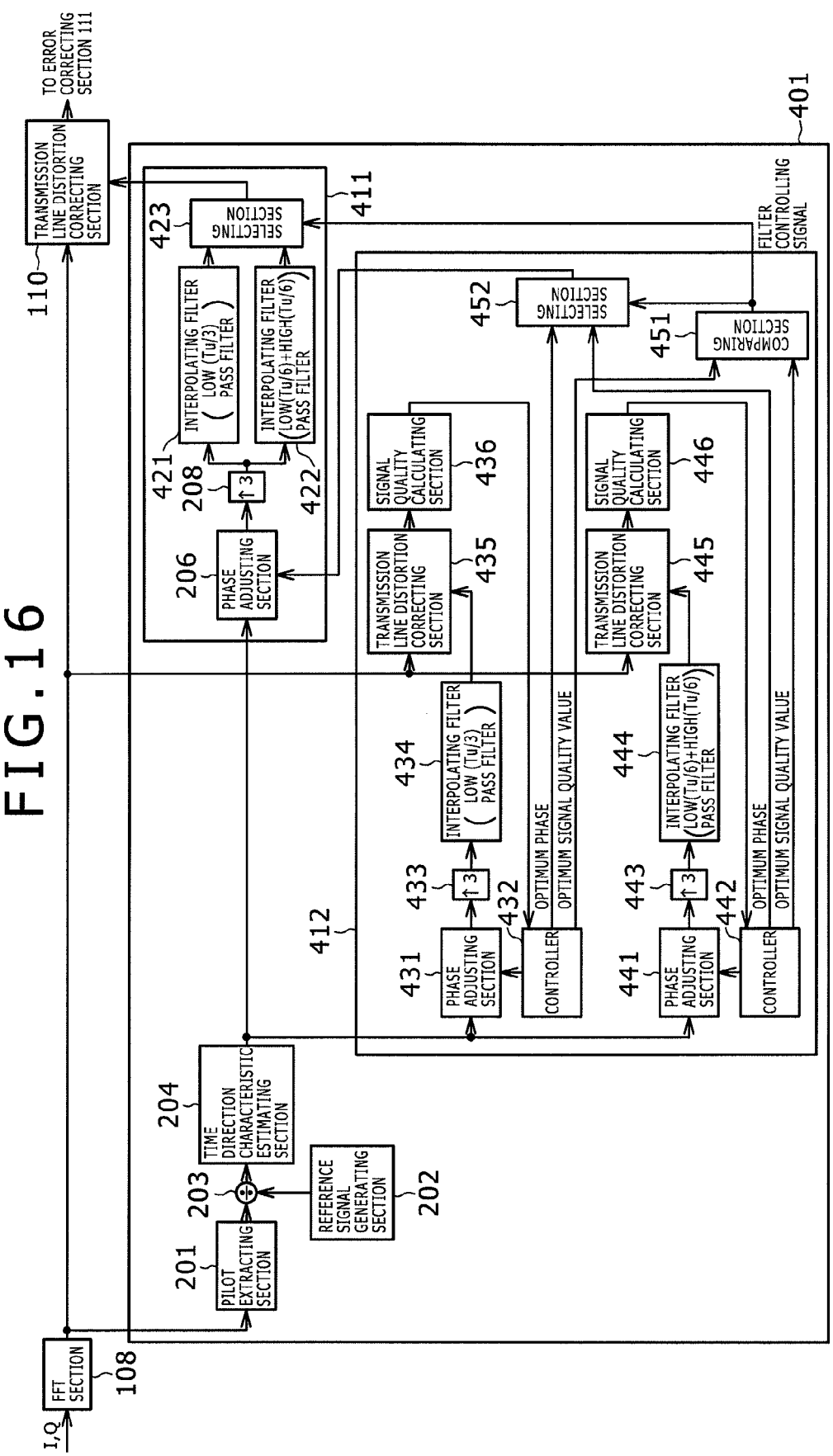
FIG. 16 is a block diagram showing an example of configuration of a second embodiment of the receiving device to which the present invention is applied.

FIG. 16 is a block diagram showing an example of configuration of a second embodiment of the receiving device to which the present invention is applied.

Incidentally, in FIG. 16, parts corresponding to those of the receiving device of FIG. 3 and FIG. 4 are identified by the same reference numerals, and description thereof will be omitted below as appropriate.

In addition, the antenna 101, the tuner 102, the BPF 103, the A/D converter section 104, the quadrature demodulating section 105, the offset correcting section 106, the symbol timing regenerating section 107, and the error correcting section 111 in FIG. 3 are not shown in FIG. 16.

The receiving device in FIG. 16 is formed in the same manner as in FIG. 3 except that the receiving device in FIG. 16 is provided with a transmission line characteristic estimating section 401 in place of the transmission line characteristic estimating section 109.

The transmission line characteristic estimating section 401 has commonalities with the transmission line characteristic estimating section 109 in FIG. 4 in that the transmission line characteristic estimating section 401 is provided with a pilot extracting section 201, a reference signal generating section 202, an arithmetic section 203, and a time direction characteristic estimating section 204.

However, the transmission line characteristic estimating section 401 is different from the transmission line characteristic estimating section 109 in FIG. 4 in that the transmission line characteristic estimating section 401 is provided with a frequency direction characteristic estimating section 411 in place of the frequency direction characteristic estimating section 205 (FIG. 4) and is newly provided with a filter controlling section 412.

The frequency direction characteristic estimating section 411 is supplied with time direction interpolation characteristic data from the time direction characteristic estimating section 204.

The frequency direction characteristic estimating section 411 filters the time direction interpolation characteristic data from the time direction characteristic estimating section 204 by each of interpolating filters 421 and 422 used for interpolation. The frequency direction characteristic estimating section 411 thereby estimates transmission line characteristics in which interpolation is performed in a frequency direction. The frequency direction characteristic estimating section 411 outputs transmission line characteristic data (frequency direction interpolation characteristic data) indicating the transmission line characteristics.

Specifically, the frequency direction characteristic estimating section 411 includes a phase adjusting section 206, an upsampling section 208, the interpolating filters 421 and 422, and a selecting section 423.

In FIG. 16, the phase adjusting section 206 is supplied with the time direction interpolation characteristic data from the time direction characteristic estimating section 204 and is also supplied with a phase offset from the filter controlling section 412.

As in the case of FIG. 4, the phase adjusting section 206 adjusts the phase of the time direction interpolation characteristic data from the time direction characteristic estimating section 204 according to the phase offset from the filter controlling section 412. The phase adjusting section 206 supplies the time direction interpolation characteristic data after the phase adjustment to the upsampling section 208.

As in the case of FIG. 4, the upsampling section 208 interpolates two zeros between sample values of the time direction interpolation characteristic data supplied from the phase adjusting section 206, and supplies zero-value interpolation characteristic data obtained as a result to the two interpolating filters 421 and 422 as a plurality of interpolating filters.

As with the interpolating filter 209 in FIG. 4, for example, the interpolating filter 421 is an LPF (Low Pass Filter) having one band with a bandwidth Tu/3 from −Tu/6 to +Tu/6. The interpolating filter 421 obtains transmission line characteristic data indicating transmission line characteristics in which interpolation in the frequency direction is performed (frequency direction interpolation characteristic data) by filtering the zero-value interpolation characteristic data from the upsampling section 208. The interpolating filter 421 outputs the frequency direction interpolation characteristic data to the selecting section 423.

The interpolating filter 422 is a filter having, as pass band, two bands (a low-frequency band and a high-frequency band) whose bandwidth $BW_1$ of the low-frequency band and bandwidth $BW_2$ of the high-frequency band are each Tu/6 as shown in FIG. 13, for example. The interpolating filter 422 obtains frequency direction interpolation characteristic data by filtering the zero-value interpolation characteristic data from the upsampling section 208. The interpolating filter 422 outputs the frequency direction interpolation characteristic data to the selecting section 423.

Thus, the frequency direction characteristic estimating section 411 in FIG. 16 has the two interpolating filters 421 and 422 as a plurality of interpolating filters having different pass bands. The pass band of at least one of the interpolating filters 421 and 422, that is, the interpolating filter 422 is a plurality of bands, that is, the low-frequency band and the high-frequency band whose bandwidths $BW_1$ and $BW_2$ are each Tu/6.

The selecting section 423 is supplied with the frequency direction interpolation characteristic data from each of the interpolating filters 421 and 422, and is also supplied with a filter controlling signal from the filter controlling section 412.

The selecting section 423 selects one of the interpolating filters 421 and 422 according to the filter controlling signal from the filter controlling section 412. The selecting section 423 supplies the frequency direction interpolation characteristic data as output of the selected interpolating filter to a transmission line distortion correcting section 110.

The filter controlling section 412 for example selects one interpolating filter from the two interpolating filters 421 and 422 having different pass bands on the basis of the signal quality of an OFDM frequency domain signal after distortion correction or the like. The filter controlling section 412 thereby controls the pass band of the interpolating filter for obtaining transmission line characteristic data (frequency direction interpolation characteristic data) used for distortion correction in the transmission line distortion correcting section 110.

Specifically, as blocks for adjusting the phase of the time direction interpolation characteristic data that becomes the zero-value interpolation characteristic data to an optimum phase when the interpolating filter 421 having one band as pass band filters the zero-value interpolation characteristic data, the filter controlling section 412 has a phase adjusting section 431, a controller 432, an upsampling section 433, an interpolating filter 434, a transmission line distortion correcting section 435, and a signal quality calculating section 436.

In addition, as blocks for adjusting the phase of the time direction interpolation characteristic data that becomes the zero-value interpolation characteristic data to an optimum phase when the interpolating filter 422 having two bands as pass band filters the zero-value interpolation characteristic data, the filter controlling section 412 has a phase adjusting section 441, a controller 442, an upsampling section 443, an interpolating filter 444, a transmission line distortion correcting section 445, and a signal quality calculating section 446.

Further, the filter controlling section 412 has a comparing section 451 and a selecting section 452.

In this case, adjusting the phase of the time direction interpolation characteristic data to an optimum phase means for example adjusting the phase of the time direction interpolation characteristic data such that only desired paths are included in the pass band when the zero-value interpolation characteristic data is filtered, as shown in FIG. 7 or FIG. 13. In this case, for example, a plurality of phase candidates are prepared as candidates for an optimum phase, and a candidate that makes the signal quality of the OFDM frequency domain signal after the distortion correction best signal quality among the plurality of phase candidates is adopted as an optimum phase.

In the filter controlling section 412, the phase adjusting section 431 is supplied with the time direction interpolation characteristic data output by the time direction characteristic estimating section 204. Further, the phase adjusting section 431 is supplied with a phase offset for adjusting the phase of the time direction interpolation characteristic data from the controller 432.

Specifically, the controller 432 stores a table storing a plurality of phase candidates as candidates for an optimum phase (which table will hereinafter be referred to also as a phase table) in a built-in memory (not shown). The controller 432 selects a phase candidate stored in the candidate table as a phase offset of interest in order for each unit of a predetermined number of OFDM symbols such as each unit of one OFDM symbol, each unit of a few OFDM symbols, or the like. The controller 432 supplies the phase offset of interest to the phase adjusting section 431.

As with the phase adjusting section 206 in the frequency direction characteristic estimating section 411, the phase adjusting section 431 adjusts the phase of the time direction interpolation characteristic data from the time direction characteristic estimating section 204 according to the phase offset of interest from the controller 432. The phase adjusting section 431 supplies the time direction interpolation characteristic data after the phase adjustment to the upsampling section 433.

As with the upsampling section 208 in the frequency direction characteristic estimating section 411, the upsampling section 433 generates zero-value interpolation characteristic data by interpolating zeros in the time direction interpolation characteristic data from the phase adjusting section 431. The upsampling section 433 supplies the zero-value interpolation characteristic data to the interpolating filter 434.

The interpolating filter 434 has identical characteristics (FIG. 7) as the interpolating filter 421 in the frequency direction characteristic estimating section 411. The interpolating filter 434 obtains frequency direction interpolation characteristic data by filtering the time direction interpolation characteristic data from the upsampling section 433. The interpolating filter 434 supplies the frequency direction interpolation characteristic data to the transmission line distortion correcting section 435.

The transmission line distortion correcting section 435 is supplied with the frequency direction interpolation characteristic data from the interpolating filter 434, and is also supplied with the OFDM frequency domain signal output by the FFT section 108.

The transmission line distortion correcting section 435 corrects distortion of the OFDM frequency domain signal from the FFT section 108 using the frequency direction interpolation characteristic data from the interpolating filter 434. The transmission line distortion correcting section 435 supplies the OFDM frequency domain signal after the distortion correction to the signal quality calculating section 436.

The signal quality calculating section 436 obtains the MER or the like of the OFDM frequency domain signal after the distortion correction from the transmission line distortion correcting section 435 as signal quality corresponding to the phase offset of interest. The signal quality calculating section 436 supplies the signal quality to the controller 432.

In this case, each time the controller 432 selects a phase offset of interest, the signal quality calculating section 436 obtains signal quality corresponding to the phase offset of interest.

The controller 432 temporarily stores the signal quality from the signal quality calculating section 436 in the phase table in association with the phase candidate being selected as the phase offset of interest.

The controller 432 selects all the phase candidates stored in the phase table as phase offset of interest. When signal qualities are thereby stored in association with all of the plurality of phase candidates in the phase table, the controller 432 selects a best signal quality (hereinafter referred to also as an optimum signal quality value) from the signal qualities.

Further, the controller 432 selects the phase candidate associated with the optimum signal quality value in the phase table as optimum phase.

Then, the controller 432 outputs the optimum signal quality value to the comparing section 451, and outputs the optimum phase to the selecting section 452.

Incidentally, the controller 432 continues outputting the optimum signal quality value and the optimum phase until the controller 432 next obtains the optimum signal quality value and the optimum phase.

In addition, when obtaining the optimum signal quality value and the optimum phase, the controller 432 clears the signal qualities stored in the phase table. Then a similar process is repeated in the phase adjusting section 431 to the signal quality calculating section 436.

The phase adjusting section 441, the controller 442, the upsampling section 443, the interpolating filter 444, the transmission line distortion correcting section 445, and the signal quality calculating section 446 perform similar processes to those of the phase adjusting section 431, the controller 432, the upsampling section 433, the interpolating filter 434, the transmission line distortion correcting section 435, and the signal quality calculating section 436, respectively.

Specifically, the controller 442 stores an identical phase table to that stored by the controller 432 in a built-in memory (not shown). In the same timing as the controller 432, the controller 442 selects a phase candidate stored in the candidate table as phase offset of interest in order, and supplies the phase offset of interest to the phase adjusting section 441.

The phase adjusting section 441 is supplied with the phase offset of interest from the controller 442, and is also supplied with the time direction interpolation characteristic data output by the time direction characteristic estimating section 204.

As with the phase adjusting section 206 in the frequency direction characteristic estimating section 411, the phase adjusting section 441 adjusts the phase of the time direction interpolation characteristic data from the time direction characteristic estimating section 204 according to the phase offset of interest from the controller 442. The phase adjusting section 441 supplies the time direction interpolation characteristic data after the phase adjustment to the upsampling section 443.

As with the upsampling section 208 in the frequency direction characteristic estimating section 411, the upsampling section 443 generates zero-value interpolation characteristic data by interpolating zeros in the time direction interpolation characteristic data from the phase adjusting section 441. The upsampling section 443 supplies the zero-value interpolation characteristic data to the interpolating filter 444.

The interpolating filter 444 has identical characteristics (FIG. 13) as the interpolating filter 422 in the frequency direction characteristic estimating section 411. The interpolating filter 444 obtains frequency direction interpolation characteristic data by filtering the time direction interpolation characteristic data from the upsampling section 443. The interpolating filter 444 supplies the frequency direction interpolation characteristic data to the transmission line distortion correcting section 445.

The transmission line distortion correcting section 445 is supplied with the frequency direction interpolation characteristic data from the interpolating filter 444, and is also supplied with the OFDM frequency domain signal output by the FFT section 108.

The transmission line distortion correcting section 445 corrects distortion of the OFDM frequency domain signal from the FFT section 108 using the frequency direction interpolation characteristic data from the interpolating filter 444. The transmission line distortion correcting section 445 supplies the OFDM frequency domain signal after the distortion correction to the signal quality calculating section 446.

In the same timing as the signal quality calculating section 436, the signal quality calculating section 446 obtains the MER or the like of the OFDM frequency domain signal after the distortion correction from the transmission line distortion correcting section 445 as signal quality corresponding to the phase offset of interest. The signal quality calculating section 446 supplies the signal quality to the controller 442.

The controller 442 temporarily stores the signal quality from the signal quality calculating section 446 in the phase table in association with the phase candidate being selected as the phase offset of interest.

The controller 442 selects all the phase candidates stored in the phase table as phase offset of interest. When signal qualities are thereby stored in association with all of the plurality of phase candidates in the phase table, the controller 442 selects an optimum signal quality value from the signal qualities.

Further, the controller 442 selects the phase candidate associated with the optimum signal quality value in the phase table as optimum phase.

Then, the controller 442 outputs the optimum signal quality value to the comparing section 451, and outputs the optimum phase to the selecting section 452.

Incidentally, as with the controller 432, the controller 442 continues outputting the optimum signal quality value and the optimum phase until the controller 442 next obtains the optimum signal quality value and the optimum phase, and when obtaining the optimum signal quality value and the optimum phase, the controller 442 clears the signal qualities stored in the phase table. Further a similar process is repeated in the phase adjusting section 441 to the signal quality calculating section 446.

The comparing section 451 compares the optimum signal quality values supplied from the respective controllers 432 and 442 with each other. The comparing section 451 outputs a filter controlling signal indicating selection of one of the interpolating filters 421 and 422 in the frequency direction characteristic estimating section 411 on the basis of a result of the comparison.

Specifically, in a case where the MER as the optimum signal quality value from the controller 432 is larger than the MER of the optimum signal quality value from the controller 442, that is, in a case where the signal quality of the OFDM frequency domain signal after the distortion correction is better when the interpolating filter 421 having the same characteristics as the interpolating filter 434 is used than when the interpolating filter 422 having the same characteristics as the interpolating filter 444 is used, the comparing section 451 outputs the filter controlling signal indicating selection of the interpolating filter 421.

In addition, in a case where the MER as the optimum signal quality value from the controller 432 is not larger than the MER of the optimum signal quality value from the controller 442, that is, in a case where the signal quality of the OFDM frequency domain signal after the distortion correction is better when the interpolating filter 422 having the same characteristics as the interpolating filter 444 is used than when the interpolating filter 421 having the same characteristics as the interpolating filter 434 is used, the comparing section 451 outputs the filter controlling signal indicating selection of the interpolating filter 422.

The filter controlling signal output by the comparing section 451 is supplied to the selecting section 452 and the frequency direction characteristic estimating section 411 (selecting section 423 in the frequency direction characteristic estimating section 411).

The selecting section 452 selects and outputs one of the optimum phases supplied from the controllers 432 and 442 respectively on the basis of the filter controlling signal from the comparing section 451.

Specifically, when the filter controlling signal from the comparing section 451 indicates selection of the interpolating filter 421, the selecting section 452 selects and outputs the optimum phase from the controller 432, that is, the optimum phase used to adjust the phase of the time direction interpolation characteristic data that becomes the zero-value interpolation characteristic data filtered by the interpolating filter 434 having the same characteristics as the interpolating filter 421.

In addition, when the filter controlling signal from the comparing section 451 indicates selection of the interpolating filter 422, the selecting section 452 selects and outputs the optimum phase from the controller 442, that is, the optimum phase used to adjust the phase of the time direction interpolation characteristic data that becomes the zero-value interpolation characteristic data filtered by the interpolating filter 444 having the same characteristics as the interpolating filter 422.

The optimum phase output by the selecting section 452 is supplied as a phase offset to the frequency direction characteristic estimating section 411 (phase adjusting section 206 in the frequency direction characteristic estimating section 411).

In the frequency direction characteristic estimating section 411, the phase adjusting section 206 adjusts the phase of the time direction interpolation characteristic data from the time direction characteristic estimating section 204 according to the phase offset supplied from the selecting section 452 in the filter controlling section 412 as described above.

Further, in the frequency direction characteristic estimating section 411, the selecting section 423 selects one of the interpolating filters 421 and 422 which one is indicated by the filter controlling signal from the filter controlling section 412. The selecting section 423 supplies the frequency direction interpolation characteristic data as output of the selected interpolating filter to the transmission line distortion correcting section 110.

Thus, in the frequency direction characteristic estimating section 411, the phase of the time direction interpolation characteristic data is adjusted (among the plurality of phase candidates stored in the phase table) so as to make the signal quality of the OFDM frequency domain signal after the distortion correction best signal quality.

Further, in the frequency direction characteristic estimating section 411, the interpolating filter that makes the signal quality of the OFDM frequency domain signal after the distortion correction better is selected from the interpolating filters 421 and 422, whereby the pass band when the zero-value interpolation characteristic data (time direction interpolation characteristic data) is filtered is controlled so as to improve the signal quality of the OFDM frequency domain signal after the distortion correction.

The transmission line distortion correcting section 110 corrects distortion of the OFDM frequency domain signal supplied from the FFT section 108 using the frequency direction interpolation characteristic data supplied from the frequency direction characteristic estimating section 411 (selecting section 423 in the frequency direction characteristic estimating section 411) as described above.

Figure 17:
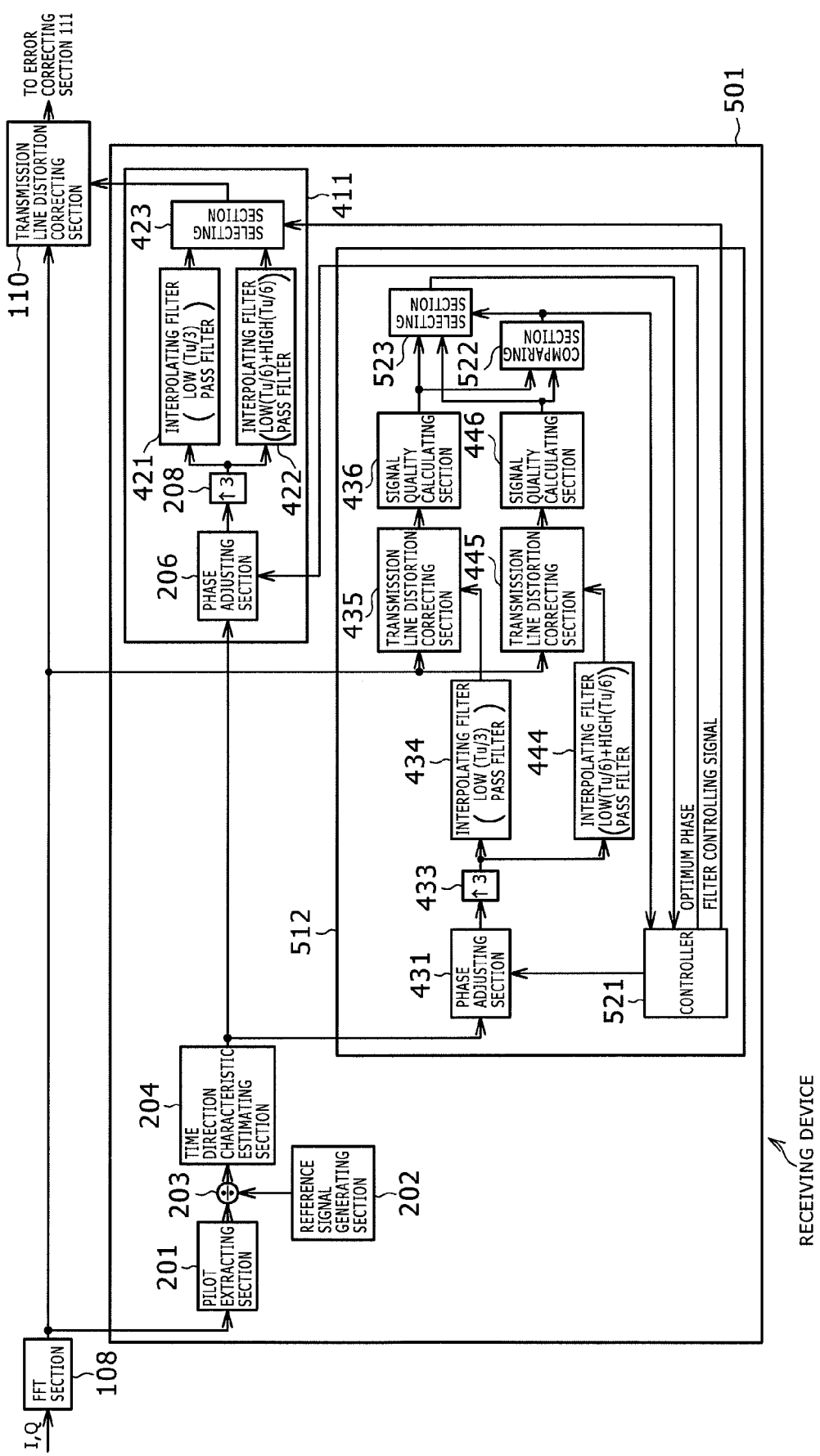
FIG. 17 is a block diagram showing an example of configuration of a third embodiment of the receiving device to which the present invention is applied.

FIG. 17 is a block diagram showing an example of configuration of a third embodiment of the receiving device to which the present invention is applied.

Incidentally, in FIG. 17, parts corresponding to those of the receiving devices of FIG. 3 and FIG. 4 and FIG. 16 are identified by the same reference numerals, and description thereof will be omitted below as appropriate.

In addition, the antenna 101, the tuner 102, the BPF 103, the A/D converter section 104, the quadrature demodulating section 105, the offset correcting section 106, the symbol timing regenerating section 107, and the error correcting section 111 in FIG. 3 are not shown in FIG. 17.

The receiving device in FIG. 17 is formed in the same manner as in FIG. 16 except that the receiving device in FIG. 17 is provided with a transmission line characteristic estimating section 501 in place of the transmission line characteristic estimating section 401 (FIG. 16).

The transmission line characteristic estimating section 501 has commonalities with the transmission line characteristic estimating section 401 in FIG. 16 in that the transmission line characteristic estimating section 501 is provided with a pilot extracting section 201, a reference signal generating section 202, an arithmetic section 203, a time direction characteristic estimating section 204, and a frequency direction characteristic estimating section 411.

However, the transmission line characteristic estimating section 501 is different from the transmission line characteristic estimating section 401 in FIG. 16 in that the transmission line characteristic estimating section 501 is provided with a filter controlling section 512 in place of the filter controlling section 412.

The filter controlling section 512 has commonalities with the filter controlling section 412 in FIG. 16 in that the filter controlling section 512 is provided with a phase adjusting section 431 to a signal quality calculating section 436 and an interpolating filter 444 to a signal quality calculating section 446.

However, the filter controlling section 512 is different from the filter controlling section 412 in FIG. 16 in that the filter controlling section 512 is not provided with the phase adjusting section 441 and the upsampling section 443.

Further, the filter controlling section 512 is different from the filter controlling section 412 in FIG. 16 in that the filter controlling section 512 is provided with one controller 521 in place of the two controllers 432 and 442, provided with a comparing section 522 in place of the comparing section 451, and provided with a selecting section 523 in place of the selecting section 452.

As with the controllers 432 and 442 in FIG. 16, the controller 521 for example stores a phase table in a built-in memory (not shown). In the same timing as the controller 432 in FIG. 16, the controller 521 selects a phase candidate stored in the candidate table as a phase offset of interest in order. The controller 521 supplies the phase offset of interest to the phase adjusting section 431.

As described with reference to FIG. 16, the phase adjusting section 431 adjusts the phase of time direction interpolation characteristic data from the time direction characteristic estimating section 204 according to the phase offset from the controller 521. The phase adjusting section 431 supplies the time direction interpolation characteristic data after the phase adjustment to the upsampling section 433.

The upsampling section 433 generates zero-value interpolation characteristic data by interpolating zeros in the time direction interpolation characteristic data from the phase adjusting section 431. The upsampling section 433 supplies the zero-value interpolation characteristic data to the interpolating filters 434 and 444.

The interpolating filter 434 obtains frequency direction interpolation characteristic data by filtering the time direction interpolation characteristic data from the upsampling section 433. The interpolating filter 434 supplies the frequency direction interpolation characteristic data to the transmission line distortion correcting section 435.

The transmission line distortion correcting section 435 corrects distortion of an OFDM frequency domain signal from an FFT section 108 using the frequency direction interpolation characteristic data from the interpolating filter 434. The transmission line distortion correcting section 435 supplies the OFDM frequency domain signal after the distortion correction to the signal quality calculating section 436.

The signal quality calculating section 436 obtains the MER or the like of the OFDM frequency domain signal after the distortion correction from the transmission line distortion correcting section 435 as signal quality corresponding to the phase offset of interest. The signal quality calculating section 436 supplies the signal quality to the comparing section 522 and the selecting section 523.

The interpolating filter 444 to the signal quality calculating section 446 perform similar processes to those of the interpolating filter 434 to the signal quality calculating section 436, respectively.

Specifically, the interpolating filter 444 obtains frequency direction interpolation characteristic data by filtering the time direction interpolation characteristic data from the upsampling section 433. The interpolating filter 444 supplies the frequency direction interpolation characteristic data to the transmission line distortion correcting section 445.

The transmission line distortion correcting section 445 corrects distortion of the OFDM frequency domain signal from the FFT section 108 using the frequency direction interpolation characteristic data from the interpolating filter 444. The transmission line distortion correcting section 445 supplies the OFDM frequency domain signal after the distortion correction to the signal quality calculating section 446.

The signal quality calculating section 446 obtains the MER or the like of the OFDM frequency domain signal after the distortion correction from the transmission line distortion correcting section 445 as signal quality corresponding to the phase offset of interest. The signal quality calculating section 446 supplies the signal quality to the comparing section 522 and the selecting section 523.

The comparing section 522 compares the signal qualities supplied from the respective signal quality calculating sections 436 and 446 with each other. The comparing section 522 outputs a filter controlling signal indicating selection of one of the interpolating filters 421 and 422 in the frequency direction characteristic estimating section 411 on the basis of a result of the comparison.

Specifically, in a case where the MER as the signal quality from the signal quality calculating section 436 is larger than the MER of the signal quality from the signal quality calculating section 446, that is, in a case where the signal quality of the OFDM frequency domain signal after the distortion correction is better when the interpolating filter 421 having the same characteristics as the interpolating filter 434 is used than when the interpolating filter 422 having the same characteristics as the interpolating filter 444 is used, the comparing section 522 outputs the filter controlling signal indicating selection of the interpolating filter 421.

In addition, in a case where the MER as the signal quality from the signal quality calculating section 436 is not larger than the MER of the signal quality from the signal quality calculating section 446, that is, in a case where the signal quality of the OFDM frequency domain signal after the distortion correction is better when the interpolating filter 422 having the same characteristics as the interpolating filter 444 is used than when the interpolating filter 421 having the same characteristics as the interpolating filter 434 is used, the comparing section 522 outputs the filter controlling signal indicating selection of the interpolating filter 422.

The filter controlling signal output by the comparing section 522 is supplied to the selecting section 523 and the controller 521.

The selecting section 523 selects and outputs one of the signal qualities supplied from the signal quality calculating sections 436 and 446 respectively on the basis of the filter controlling signal from the comparing section 522.

Specifically, when the filter controlling signal from the comparing section 522 indicates selection of the interpolating filter 421, the selecting section 523 selects and outputs the signal quality from the signal quality calculating section 436, that is, the signal quality of the OFDM frequency domain signal after the distortion correction which signal is obtained by the distortion correction using the frequency direction interpolation characteristic data obtained by filtering the zero-value interpolation characteristic data by the interpolating filter 434 having the same characteristics as the interpolating filter 421.

In addition, when the filter controlling signal from the comparing section 522 indicates selection of the interpolating filter 422, the selecting section 523 selects and outputs the signal quality from the signal quality calculating section 446, that is, the signal quality of the OFDM frequency domain signal after the distortion correction which signal is obtained by the distortion correction using the frequency direction interpolation characteristic data obtained by filtering the zero-value interpolation characteristic data by the interpolating filter 444 having the same characteristics as the interpolating filter 422.

The signal quality output by the selecting section 523 is supplied to the controller 521.

The controller 521 temporarily stores the filter controlling signal from the comparing section 522 and the signal quality from the selecting section 523 in the phase table in association with the phase candidate being selected as the phase offset of interest.

The controller 521 selects all the phase candidates stored in the phase table as phase offset of interest. When filter controlling signals and signal qualities are thereby stored in association with all of the plurality of phase candidates in the phase table, the controller 521 selects an optimum signal quality value from the signal qualities.

Further, the controller 521 selects the phase candidate associated with the optimum signal quality value in the phase table as optimum phase. The controller 521 outputs the optimum phase to the phase adjusting section 206 in the frequency direction characteristic estimating section 411.

In addition, the controller 521 selects the filter controlling signal associated with the optimum phase in the phase table. The controller 521 outputs the filter controlling signal to the selecting section 423 in the frequency direction characteristic estimating section 411.

Incidentally, when obtaining the optimum signal quality value, the controller 521 clears the signal qualities and the filter controlling signals stored in the phase table.

In addition, the controller 521 continues outputting the optimum phase and the filter controlling signal until the controller 521 next obtains the optimum signal quality value.

Further, a similar process is repeated in the filter controlling section 512.

In the frequency direction characteristic estimating section 411, the phase adjusting section 206 adjusts the phase of the time direction interpolation characteristic data from the time direction characteristic estimating section 204 using the optimum phase supplied from the controller 521 in the filter controlling section 512 as described above as phase offset.

Further, in the frequency direction characteristic estimating section 411, the selecting section 423 selects one of the interpolating filters 421 and 422 which one is indicated by the filter controlling signal from the controller 521 in the filter controlling section 512. The selecting section 423 supplies the frequency direction interpolation characteristic data as output of the selected interpolating filter to the transmission line distortion correcting section 110.

Thus, in the frequency direction characteristic estimating section 411, the phase of the time direction interpolation characteristic data is adjusted (among the plurality of phase candidates stored in the phase table) so as to make the signal quality of the OFDM frequency domain signal after the distortion correction best signal quality.

Further, in the frequency direction characteristic estimating section 411, the interpolating filter that makes the signal quality of the OFDM frequency domain signal after the distortion correction better is selected from the interpolating filters 421 and 422, whereby the pass band when the zero-value interpolation characteristic data (time direction interpolation characteristic data) is filtered is controlled so as to improve the signal quality of the OFDM frequency domain signal after the distortion correction.

The transmission line distortion correcting section 110 corrects distortion of the OFDM frequency domain signal supplied from the FFT section 108 using the frequency direction interpolation characteristic data supplied from the frequency direction characteristic estimating section 411 (selecting section 423 in the frequency direction characteristic estimating section 411) as described above.

Figure 18:
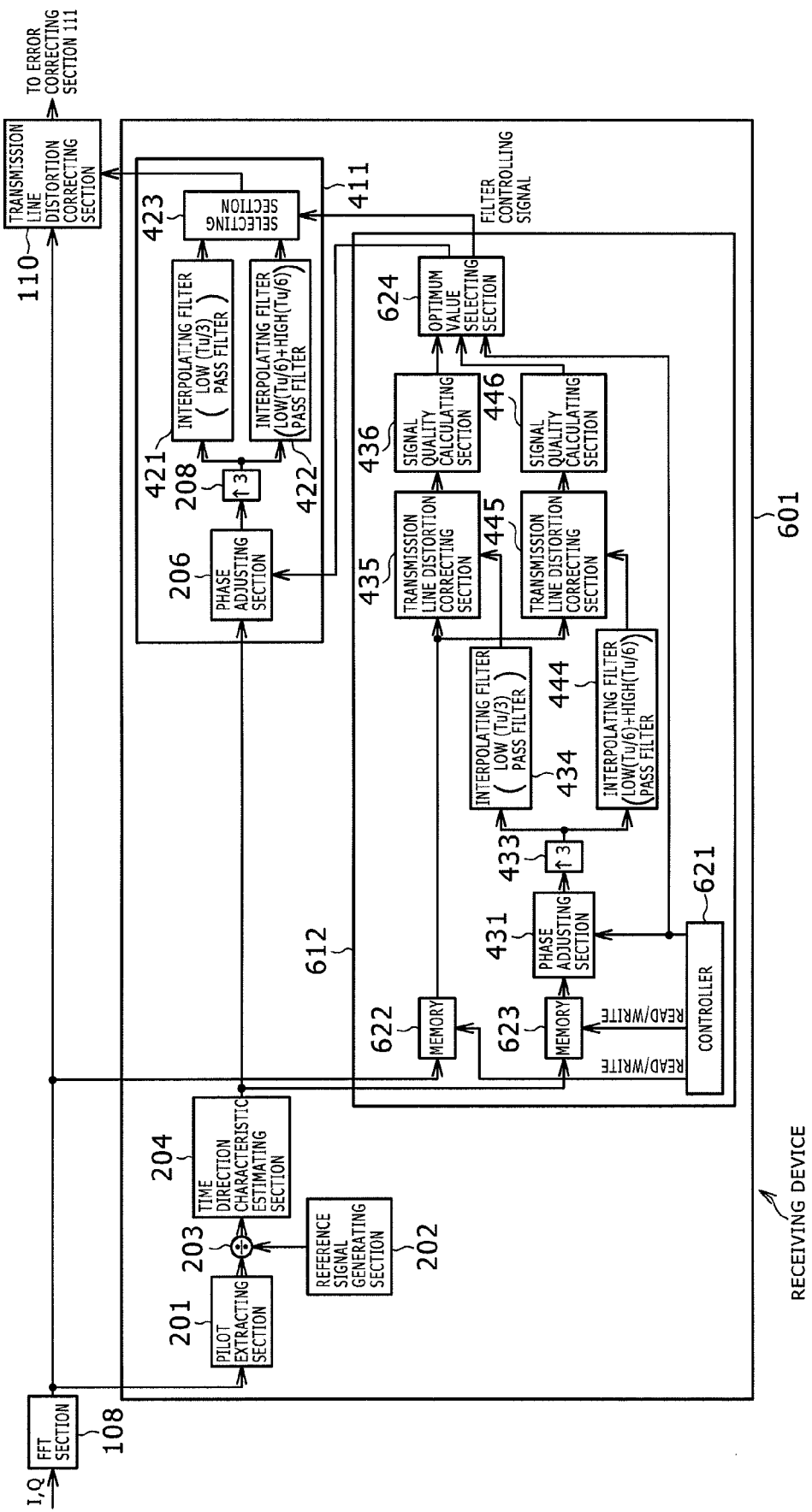
FIG. 18 is a block diagram showing an example of configuration of a fourth embodiment of the receiving device to which the present invention is applied.

FIG. 18 is a block diagram showing an example of configuration of a fourth embodiment of the receiving device to which the present invention is applied.

Incidentally, in FIG. 18, parts corresponding to those of the receiving devices of FIG. 3 and FIG. 4, FIG. 16, and FIG. 17 are identified by the same reference numerals, and description thereof will be omitted below as appropriate.

In addition, the antenna 101, the tuner 102, the BPF 103, the A/D converter section 104, the quadrature demodulating section 105, the offset correcting section 106, the symbol timing regenerating section 107, and the error correcting section 111 in FIG. 3 are not shown in FIG. 18.

The receiving device in FIG. 18 is formed in the same manner as in FIG. 17 except that the receiving device in FIG. 18 is provided with a transmission line characteristic estimating section 601 in place of the transmission line characteristic estimating section 501.

The transmission line characteristic estimating section 601 has commonalities with the transmission line characteristic estimating section 501 in FIG. 17 in that the transmission line characteristic estimating section 601 is provided with a pilot extracting section 201, a reference signal generating section 202, an arithmetic section 203, a time direction characteristic estimating section 204, and a frequency direction characteristic estimating section 411.

However, the transmission line characteristic estimating section 601 is different from the transmission line characteristic estimating section 501 in FIG. 17 in that the transmission line characteristic estimating section 601 is provided with a filter controlling section 612 in place of the filter controlling section 512.

The filter controlling section 612 has commonalities with the filter controlling section 512 in FIG. 17 in that the filter controlling section 612 is provided with a phase adjusting section 431 to a signal quality calculating section 436 and an interpolating filter 444 to a signal quality calculating section 446.

However, the filter controlling section 612 is different from the filter controlling section 512 in FIG. 17 in that the filter controlling section 612 is not provided with the comparing section 522 and the selecting section 523.

Further, the filter controlling section 612 is different from the filter controlling section 512 in FIG. 17 in that the filter controlling section 612 is provided with a controller 621 in place of the controller 521.

In addition, the filter controlling section 612 is different from the filter controlling section 512 in FIG. 17 in that the filter controlling section 612 is newly provided with memories 622 and 623 and an optimum value selecting section 624.

In the receiving device of FIG. 17 (as in the receiving device of FIG. 16), the OFDM symbol corresponding to the time direction interpolation characteristic data subjected to phase adjustment by the phase offset of interest selected from the plurality of phase candidates stored in the phase table differs for each phase candidate. On the other hand, in the receiving device of FIG. 18, the OFDM symbol corresponding to the time direction interpolation characteristic data subjected to phase adjustment by the phase offset of interest is the same for all of the plurality of phase candidates stored in the phase table.

That is, in the receiving device of FIG. 18, the time direction interpolation characteristic data corresponding to the same OFDM symbol is adjusted in phase by each of the plurality of phase candidates stored in the phase table. Then, distortion of the OFDM frequency domain signal corresponding to the same OFDM symbol is corrected using frequency direction interpolation characteristic data obtained from a plurality of pieces of time direction interpolation characteristic data after the phase adjustment, and an optimum signal quality value is obtained from signal qualities of the OFDM frequency domain signal after the distortion correction.

Specifically, in the filter controlling section 612 in FIG. 18, the memory 622 is supplied with the OFDM frequency domain signal from the FFT section 108. Further, the memory 622 is supplied with a command to read or write data and an address at which to read or write the data from the controller 621.

According to the command from the controller 621, the memory 622 reads or writes the data at the address from the same controller 621.

Specifically, the memory 622 stores an OFDM frequency domain signal corresponding to a certain OFDM symbol which signal is supplied from the FFT section 108 under control of the controller 621. Further, under control of the controller 621, the memory 622 reads the OFDM frequency domain signal stored therein, and supplies the OFDM frequency domain signal to the transmission line distortion correcting sections 435 and 445.

The memory 623 is supplied with time direction interpolation characteristic data from the time direction characteristic estimating section 204. Further, the memory 623 is supplied with a command to read or write data and an address at which to read or write the data from the controller 621.

According to the command from the controller 621, the memory 623 reads or writes the data at the address from the same controller 621.

Specifically, the memory 623 stores time direction interpolation characteristic data corresponding to the OFDM symbol corresponding to the OFDM frequency domain signal stored in the memory 622, the time direction interpolation characteristic data being supplied from the time direction characteristic estimating section 204, under control of the controller 621. Further, under control of the controller 621, the memory 623 reads the time direction interpolation characteristic data stored therein, and supplies the time direction interpolation characteristic data to the phase adjusting section 431.

As with the controller 521 in FIG. 17, the controller 621 stores a phase table in a built-in memory (not shown). The controller 621 selects a phase candidate stored in the candidate table as phase offset of interest in order, and supplies the phase offset of interest to the phase adjusting section 431 and the optimum value selecting section 624.

Further, when supplying the phase offset of interest to the phase adjusting section 431 and the optimum value selecting section 624, the controller 621 controls the memory 622 to read the OFDM frequency domain signal from the memory 622 and supply the OFDM frequency domain signal to the transmission line distortion correcting sections 435 and 445, and controls the memory 623 to read the time direction interpolation characteristic data from the memory 623 and supply the time direction interpolation characteristic data to the phase adjusting section 431.

Thus, each time the controller 621 selects a new phase offset of interest from the phase candidates stored in the candidate table, the OFDM frequency domain signal corresponding to the same OFDM symbol which signal is stored in the memory 622 is read, and the time direction interpolation characteristic data corresponding to the same OFDM symbol which data is stored in the memory 623 is read.

As described with reference to FIG. 16, the phase adjusting section 431 adjusts the phase of the time direction interpolation characteristic data from the time direction characteristic estimating section 204 according to the phase offset of interest from the controller 621. The phase adjusting section 431 supplies the time direction interpolation characteristic data after the phase adjustment to the upsampling section 433.

The upsampling section 433 generates zero-value interpolation characteristic data by interpolating zeros in the time direction interpolation characteristic data from the phase adjusting section 431. The upsampling section 433 supplies the zero-value interpolation characteristic data to the interpolating filters 434 and 444.

The interpolating filter 434 obtains frequency direction interpolation characteristic data by filtering the time direction interpolation characteristic data from the upsampling section 433. The interpolating filter 434 supplies the frequency direction interpolation characteristic data to the transmission line distortion correcting section 435.

The transmission line distortion correcting section 435 corrects distortion of the OFDM frequency domain signal from the memory 622 using the frequency direction interpolation characteristic data from the interpolating filter 434. The transmission line distortion correcting section 435 supplies the OFDM frequency domain signal after the distortion correction to the signal quality calculating section 436.

The signal quality calculating section 436 obtains the MER or the like of the OFDM frequency domain signal after the distortion correction from the transmission line distortion correcting section 435 as signal quality corresponding to the phase offset of interest. The signal quality calculating section 436 supplies the signal quality to the optimum value selecting section 624.

The interpolating filter 444 to the signal quality calculating section 446 perform similar processes to those of the interpolating filter 434 to the signal quality calculating section 436, respectively.

Specifically, the interpolating filter 444 obtains frequency direction interpolation characteristic data by filtering the time direction interpolation characteristic data from the upsampling section 433. The interpolating filter 444 supplies the frequency direction interpolation characteristic data to the transmission line distortion correcting section 445.

The transmission line distortion correcting section 445 corrects distortion of the OFDM frequency domain signal from the memory 622 using the frequency direction interpolation characteristic data from the interpolating filter 444. The transmission line distortion correcting section 445 supplies the OFDM frequency domain signal after the distortion correction to the signal quality calculating section 446.

The signal quality calculating section 446 obtains the MER or the like of the OFDM frequency domain signal after the distortion correction from the transmission line distortion correcting section 445 as signal quality corresponding to the phase offset of interest. The signal quality calculating section 446 supplies the signal quality to the optimum value selecting section 624.

The optimum value selecting section 624 compares the signal qualities supplied from the signal quality calculating sections 436 and 446 with each other. The optimum value selecting section 624 stores the better signal quality in association with the phase candidate being selected as phase offset of interest from the controller 621.

The controller 621 selects all the phase candidates stored in the phase table as phase offset of interest. When the optimum value selecting section 624 stores signal qualities obtained using the OFDM frequency domain signal stored in the memory 622 and the time direction interpolation characteristic data stored in the memory 623 in association with all of the plurality of phase candidates in the phase table, the optimum value selecting section 624 selects an optimum signal quality value from the signal qualities.

Further, the optimum value selecting section 624 selects the phase candidate associated with the optimum signal quality value in the phase table as optimum phase. The optimum value selecting section 624 outputs the optimum phase to the phase adjusting section 206 in the frequency direction characteristic estimating section 411.

In addition, the optimum value selecting section 624 selects, as an optimum filter, one of the interpolating filters 434 and 444 from which the frequency direction interpolation characteristic data used to correct distortion of the OFDM frequency domain signal having the optimum signal quality value is obtained. Then, the optimum value selecting section 624 generates a filter controlling signal indicating selection of one of the interpolating filters 421 and 422 in the frequency direction characteristic estimating section 411 which filter has the same characteristics as the optimum filter. The optimum value selecting section 624 outputs the filter controlling signal to the selecting section 423 in the frequency direction characteristic estimating section 411.

Incidentally, when obtaining the optimum signal quality value, the optimum value selecting section 624 clears the phase candidates and the signal qualities stored in association with each other.

In addition, the optimum value selecting section 624 continues outputting the optimum phase and the filter controlling signal until the optimum value selecting section 624 next obtains the optimum signal quality value.

When the controller 621 has selected all of the phase candidates stored in the phase table as phase offset of interest, and the optimum value selecting section 624 starts outputting the optimum phase and the filter controlling signal, the controller 621 controls the memory 622 to store an OFDM frequency domain signal corresponding to a next OFDM symbol, and controls the memory 623 to store time direction interpolation characteristic data corresponding to the next OFDM symbol.

The memory 622 stores (is overwritten with) the OFDM frequency domain signal corresponding to the next OFDM symbol which signal is supplied from the FFT section 108 under control of the controller 621.

The memory 623 similarly stores the time direction interpolation characteristic data corresponding to the next OFDM symbol which data is supplied from the time direction characteristic estimating section 204 under control of the controller 621.

Thereafter a similar process is repeated.

Meanwhile, in the frequency direction characteristic estimating section 411, the phase adjusting section 206 adjusts the phase of the time direction interpolation characteristic data that is supplied from the time direction characteristic estimating section 204 and which is identical to that stored in the memory 623 using the optimum phase supplied from the optimum value selecting section 624 in the filter controlling section 612 as described above as phase offset.

Further, in the frequency direction characteristic estimating section 411, the selecting section 423 selects one of the interpolating filters 421 and 422 which one is indicated by the filter controlling signal from the optimum value selecting section 624 in the filter controlling section 612. The selecting section 423 supplies the frequency direction interpolation characteristic data as output of the selected interpolating filter to the transmission line distortion correcting section 110.

Thus, in the frequency direction characteristic estimating section 411, the phase of the time direction interpolation characteristic data is adjusted (among the plurality of phase candidates stored in the phase table) so as to make the signal quality of the OFDM frequency domain signal after the distortion correction best signal quality.

Further, in the frequency direction characteristic estimating section 411, the interpolating filter that makes the signal quality of the OFDM frequency domain signal after the distortion correction better is selected from the interpolating filters 421 and 422, whereby the pass band when the zero-value interpolation characteristic data (time direction interpolation characteristic data) is filtered is controlled so as to improve the signal quality of the OFDM frequency domain signal after the distortion correction.

The transmission line distortion correcting section 110 corrects distortion of the OFDM frequency domain signal that is supplied from the FFT section 108 and which is identical to that stored in the memory 622 using the frequency direction interpolation characteristic data supplied from the frequency direction characteristic estimating section 411 (selecting section 423 in the frequency direction characteristic estimating section 411) as described above.

Figure 19:
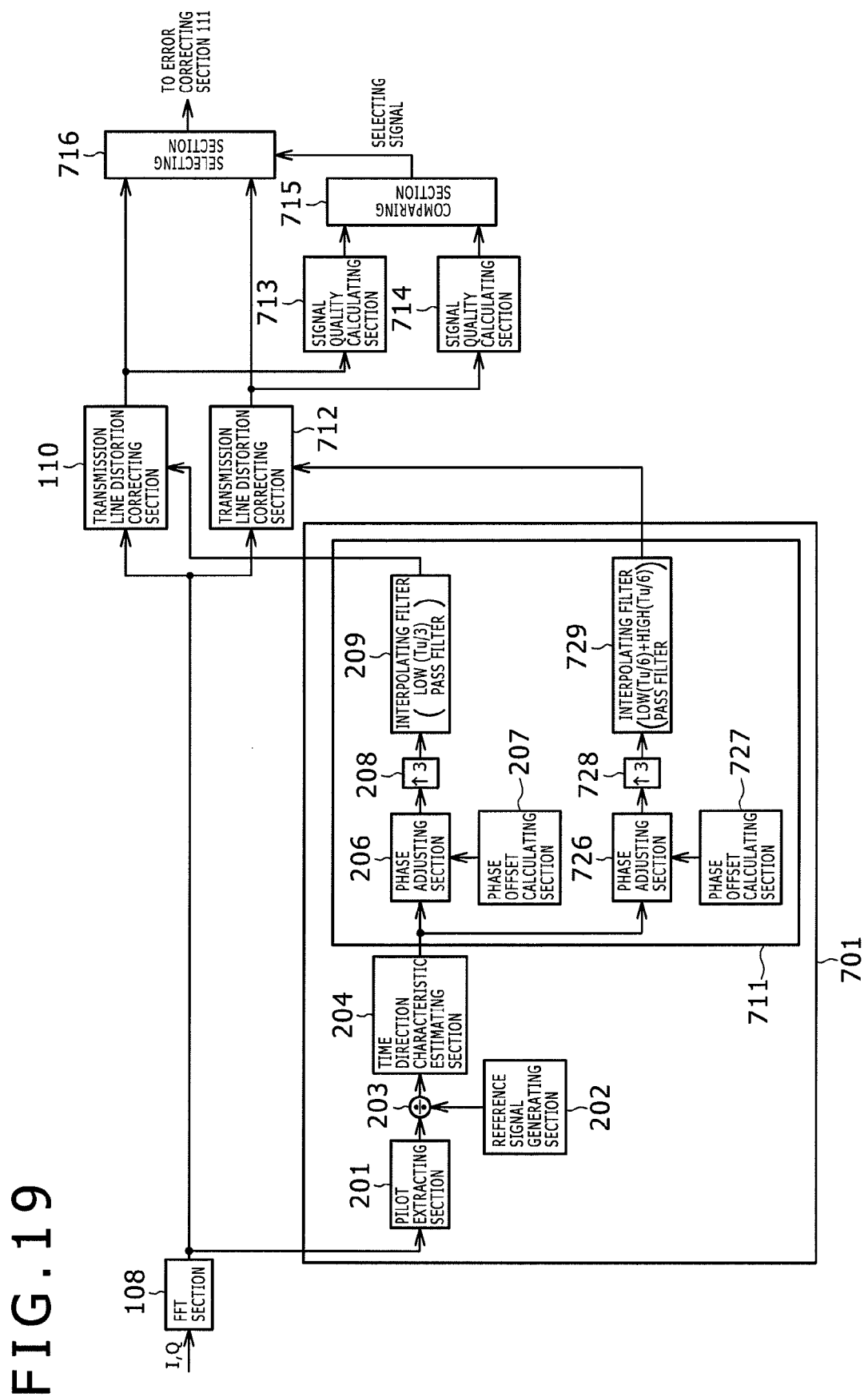
FIG. 19 is a block diagram showing an example of configuration of a fifth embodiment of the receiving device to which the present invention is applied.

FIG. 19 is a block diagram showing an example of configuration of a fifth embodiment of the receiving device to which the present invention is applied.

Incidentally, in FIG. 19, parts corresponding to those of the receiving devices of FIG. 3 and FIG. 4 are identified by the same reference numerals, and description thereof will be omitted below as appropriate.

In addition, the antenna 101, the tuner 102, the BPF 103, the A/D converter section 104, the quadrature demodulating section 105, the offset correcting section 106, the symbol timing regenerating section 107, and the error correcting section 111 in FIG. 3 are not shown in FIG. 19.

The receiving device in FIG. 19 is different from that of FIG. 3 and FIG. 4 in that the receiving device in FIG. 19 is newly provided with a transmission line distortion correcting section 712, signal quality calculating sections 713 and 714, a comparing section 715, and a selecting section 716.

Further, the receiving device in FIG. 19 is different from that of FIG. 3 and FIG. 4 in that the receiving device in FIG. 19 is provided with a transmission line characteristic estimating section 701 in place of the transmission line characteristic estimating section 109.

The transmission line characteristic estimating section 701 has commonalities with the transmission line characteristic estimating section 109 in FIG. 4 in that the transmission line characteristic estimating section 701 is provided with a pilot extracting section 201, a reference signal generating section 202, an arithmetic section 203, and a time direction characteristic estimating section 204.

However, the transmission line characteristic estimating section 701 is different from the transmission line characteristic estimating section 109 in FIG. 4 in that the transmission line characteristic estimating section 701 is provided with a frequency direction characteristic estimating section 711 in place of the frequency direction characteristic estimating section 205.

The frequency direction characteristic estimating section 711 is different from the frequency direction characteristic estimating section 205 in FIG. 4 in that the frequency direction characteristic estimating section 711 is newly provided with a phase adjusting section 726, a phase offset calculating section 727, an upsampling section 728, and an interpolating filter 729.

In the receiving device of FIG. 19, the pilot extracting section 201 extracts a pilot signal from an OFDM frequency domain signal from an FFT section 108, and supplies the pilot signal to the arithmetic section 203.

The arithmetic section 203 obtains transmission line characteristic data with respect to the pilot signal using the pilot signal from the pilot extracting section 201 and a reference signal supplied from the reference signal generating section 202. The arithmetic section 203 outputs the transmission line characteristic data to the time direction characteristic estimating section 204.

The time direction characteristic estimating section 204 obtains time direction interpolation characteristic data using the transmission line characteristic data with respect to the pilot signal from the arithmetic section 203. The time direction characteristic estimating section 204 supplies the time direction interpolation characteristic data to the frequency direction characteristic estimating section 711.

The frequency direction characteristic estimating section 711 obtains two pieces of frequency direction interpolation characteristic data as a plurality of pieces of frequency direction interpolation characteristic data by filtering the time direction interpolation characteristic data from the time direction characteristic estimating section 204 by each of two interpolating filters 209 and 729 as a plurality of interpolating filters having different pass bands. The frequency direction characteristic estimating section 711 outputs the two pieces of frequency direction interpolation characteristic data.

Specifically, as with the frequency direction characteristic estimating section 205 in FIG. 4, the frequency direction characteristic estimating section 711 has a phase adjusting section 206, a phase offset calculating section 207, an upsampling section 208, and an interpolating filter 209.

In the frequency direction characteristic estimating section 711, the phase offset calculating section 207 for example calculates a phase offset using the delay spread of a multipath as described with reference to FIG. 4. The phase offset calculating section 207 supplies the phase offset to the phase adjusting section 206.

The phase adjusting section 206 adjusts the phase of the time direction interpolation characteristic data supplied from the time direction characteristic estimating section 204 to the frequency direction characteristic estimating section 711 according to the phase offset from the phase offset calculating section 207. The phase adjusting section 206 then supplies the time direction interpolation characteristic data to the upsampling section 208.

The upsampling section 208 generates zero-value interpolation characteristic data by interpolating zeros between sample values of the time direction interpolation characteristic data from the phase adjusting section 206. The upsampling section 208 supplies the zero-value interpolation characteristic data to the interpolating filter 209.

The interpolating filter 209 is an LPF having a band from −Tu/6 to +Tu/6 shown in FIG. 7 as a pass band. The interpolating filter 209 obtains frequency direction interpolation characteristic data by filtering the zero-value interpolation characteristic data from the upsampling section 208. The interpolating filter 209 outputs the frequency direction interpolation characteristic data.

The frequency direction characteristic estimating section 711 further includes a phase adjusting section 726, a phase offset calculating section 727, an upsampling section 728, and an interpolating filter 729.

In the frequency direction characteristic estimating section 711, as with the phase offset calculating section 207, the phase offset calculating section 727 for example calculates a phase offset, and supplies the phase offset to the phase adjusting section 726.

As with the phase adjusting section 206, the phase adjusting section 726 adjusts the phase of the time direction interpolation characteristic data supplied from the time direction characteristic estimating section 204 to the frequency direction characteristic estimating section 711 according to the phase offset from the phase offset calculating section 727. The phase adjusting section 726 then supplies the time direction interpolation characteristic data to the upsampling section 728.

As with the upsampling section 208, the upsampling section 728 generates zero-value interpolation characteristic data by interpolating zeros between sample values of the time direction interpolation characteristic data from the phase adjusting section 726. The upsampling section 728 supplies the zero-value interpolation characteristic data to the interpolating filter 729.

The interpolating filter 729 is a filter having, as pass band, two bands (a low-frequency band and a high-frequency band) whose bandwidth $BW_1$ of the low-frequency band and bandwidth $BW_2$ of the high-frequency band are each Tu/6 as shown in FIG. 13, for example. The interpolating filter 729 obtains frequency direction interpolation characteristic data by filtering the zero-value interpolation characteristic data from the upsampling section 728. The interpolating filter 729 outputs the frequency direction interpolation characteristic data.

Thus, the frequency direction characteristic estimating section 711 in FIG. 19 has the two interpolating filters 209 and 729 as a plurality of interpolating filters having different pass bands. The pass band of at least one of the interpolating filters 209 and 729, that is, the interpolating filter 729 is a plurality of bands, that is, the low-frequency band and the high-frequency band whose bandwidths $BW_1$ and $BW_2$ are each Tu/6.

The two transmission line distortion correcting sections 110 and 712 as a plurality of transmission line distortion correcting sections correct distortion of the OFDM frequency domain signal supplied from the FFT section 108 using the two pieces of frequency direction interpolation characteristic data as a plurality of pieces of frequency direction interpolation characteristic data output from the frequency direction characteristic estimating section 711 as described above.

Specifically, the transmission line distortion correcting section 110 is supplied with the frequency direction interpolation characteristic data output by the interpolating filter 209, and is supplied with the OFDM frequency domain signal from the FFT section 108.

The transmission line distortion correcting section 110 corrects distortion of the OFDM frequency domain signal from the FFT section 108 using the frequency direction interpolation characteristic data from the interpolating filter 209. The transmission line distortion correcting section 110 supplies the OFDM frequency domain signal after the distortion correction to the signal quality calculating section 713 and the selecting section 716.

Meanwhile, the transmission line distortion correcting section 712 is supplied with the frequency direction interpolation characteristic data output by the interpolating filter 729, and is supplied with the OFDM frequency domain signal from the FFT section 108.

The transmission line distortion correcting section 712 corrects distortion of the OFDM frequency domain signal from the FFT section 108 using the frequency direction interpolation characteristic data from the interpolating filter 729. The transmission line distortion correcting section 712 supplies the OFDM frequency domain signal after the distortion correction to the signal quality calculating section 714 and the selecting section 716.

The signal quality calculating section 713 determines the signal quality such as the MER of the OFDM frequency domain signal after the distortion correction from the transmission line distortion correcting section 110. The signal quality calculating section 713 supplies the signal quality to the comparing section 715.

The signal quality calculating section 714 determines the signal quality such as the MER of the OFDM frequency domain signal after the distortion correction from the transmission line distortion correcting section 712. The signal quality calculating section 714 supplies the signal quality to the comparing section 715.

The comparing section 715 compares the signal qualities supplied from the signal quality calculating sections 713 and 714, respectively, with each other. The comparing section 715 supplies a selecting signal indicating selection of the OFDM frequency domain signal of one of the transmission line distortion correcting sections 110 and 712 on the basis of a result of the comparison to the selecting section 716.

Specifically, in a case where the MER as the signal quality from the signal quality calculating section 713 is larger than the MER of the signal quality from the signal quality calculating section 714, that is, in a case where the signal quality of the OFDM frequency domain signal after the distortion correction is better when the interpolating filter 209 is used than when the interpolating filter 729 is used, the comparing section 715 supplies the selecting signal indicating selection of the OFDM frequency domain signal supplied from the transmission line distortion correcting section 110 performing the distortion correction using the frequency direction interpolation characteristic data obtained by the interpolating filter 209 to the selecting section 716.

In addition, in a case where the MER as the signal quality from the signal quality calculating section 713 is not larger than the MER of the signal quality from the signal quality calculating section 714, that is, in a case where the signal quality of the OFDM frequency domain signal after the distortion correction is better when the interpolating filter 729 is used than when the interpolating filter 209 is used, the comparing section 715 supplies the selecting signal indicating selection of the OFDM frequency domain signal supplied from the transmission line distortion correcting section 712 performing the distortion correction using the frequency direction interpolation characteristic data obtained by the interpolating filter 729 to the selecting section 716.

On the basis of the selecting signal from the comparing section 715, the selecting section 716 selects the OFDM frequency domain signal after the distortion correction from one of the transmission line distortion correcting sections 110 and 712. The selecting section 716 supplies the OFDM frequency domain signal after the distortion correction to the error correcting section 111.

Specifically, when the selecting signal from the comparing section 715 indicates selection of the OFDM frequency domain signal supplied from the transmission line distortion correcting section 110, that is, when the OFDM frequency domain signal supplied from the transmission line distortion correcting section 110 has better signal quality than the OFDM frequency domain signal supplied from the transmission line distortion correcting section 712, the selecting section 716 selects the OFDM frequency domain signal having the better signal quality, and supplies the OFDM frequency domain signal to the error correcting section 111.

In addition, when the selecting signal from the comparing section 715 indicates selection of the OFDM frequency domain signal supplied from the transmission line distortion correcting section 712, that is, when the OFDM frequency domain signal supplied from the transmission line distortion correcting section 712 has better signal quality than the OFDM frequency domain signal supplied from the transmission line distortion correcting section 110, the selecting section 716 selects the OFDM frequency domain signal having the better signal quality, and supplies the OFDM frequency domain signal to the error correcting section 111.

A process performed after the FFT operation of the FFT section 108 in the receiving device of FIG. 19 will next be described with reference to FIG. 20.

An OFDM frequency domain signal obtained by the FFT operation in the FFT section 108 is supplied to the transmission line distortion correcting sections 110 and 712 and the pilot extracting section 201.

The pilot extracting section 201 in step S51 extracts a pilot signal from the OFDM frequency domain signal from the FFT section 108, and then supplies the pilot signal to the arithmetic section 203. The process proceeds to step S52.

In step S52, using the pilot signal from the pilot extracting section 201, the arithmetic section 203 estimates transmission line characteristics with respect to the pilot signal. The arithmetic section 203 outputs transmission line characteristic data indicating the transmission line characteristics to the time direction characteristic estimating section 204. The process proceeds to step S53.

The time direction characteristic estimating section 204 in step S53 estimates transmission line characteristics in which interpolation in a time direction is performed using the transmission line characteristic data indicating the transmission line characteristics with respect to the pilot signal from the arithmetic section 203. The time direction characteristic estimating section 204 then outputs transmission line characteristic data indicating the transmission line characteristics (time direction interpolation characteristic data) to the frequency direction characteristic estimating section 711. The process proceeds from step S53 to step S54.

In step S54, in the frequency direction characteristic estimating section 711, the phase offset calculating section 207 calculates a phase offset and supplies the phase offset to the phase adjusting section 206, and the phase offset calculating section 727 calculates a phase offset and supplies the phase offset to the phase adjusting section 726.

Further, in step S54, the phase adjusting section 206 adjusts the phase of the time direction interpolation characteristic data from the time direction characteristic estimating section 204 according to the phase offset from the phase offset calculating section 207, and supplies the time direction interpolation characteristic data to the upsampling section 208. Simultaneously, the phase adjusting section 726 adjusts the phase of the time direction interpolation characteristic data from the time direction characteristic estimating section 204 according to the phase offset from the phase offset calculating section 727, and supplies the time direction interpolation characteristic data to the upsampling section 728.

Thereafter, the upsampling section 208 obtains zero-value interpolation characteristic data by upsampling the time direction interpolation characteristic data from the phase adjusting section 206, and supplies the zero-value interpolation characteristic data to the interpolating filter 209. Simultaneously, the upsampling section 728 obtains zero-value interpolation characteristic data by upsampling the time direction interpolation characteristic data from the phase adjusting section 726, and supplies the zero-value interpolation characteristic data to the interpolating filter 729.

Thereafter the process proceeds from step S54 to step S55, where the frequency direction characteristic estimating section 711 obtains two pieces of frequency direction interpolation characteristic data by filtering the time direction interpolation characteristic data from the time direction characteristic estimating section 204 (zero-value interpolation characteristic data obtained from the time direction interpolation characteristic data) by each of the two interpolating filters 209 and 729 having different pass bands. The frequency direction characteristic estimating section 711 outputs the two pieces of frequency direction interpolation characteristic data.

Specifically, in the frequency direction characteristic estimating section 711, the interpolating filter 209 obtains the frequency direction interpolation characteristic data by filtering the zero-value interpolation characteristic data from the upsampling section 208. The interpolating filter 209 supplies the frequency direction interpolation characteristic data to the transmission line distortion correcting section 110.

Simultaneously, the interpolating filter 729 obtains the frequency direction interpolation characteristic data by filtering the zero-value interpolation characteristic data from the upsampling section 728. The interpolating filter 729 supplies the frequency direction interpolation characteristic data to the transmission line distortion correcting section 712.

Then the process proceeds from step S55 to step S56, where the transmission line distortion correcting section 110 corrects distortion of the OFDM frequency domain signal from the FFT section 108 using the frequency direction interpolation characteristic data from the interpolating filter 209. The transmission line distortion correcting section 110 then supplies the OFDM frequency domain signal after the distortion correction to the signal quality calculating section 713 and the selecting section 716.

Simultaneously, in step S56, the transmission line distortion correcting section 712 corrects the distortion of the OFDM frequency domain signal from the FFT section 108 using the frequency direction interpolation characteristic data from the interpolating filter 729. The transmission line distortion correcting section 712 then supplies the OFDM frequency domain signal after the distortion correction to the signal quality calculating section 714 and the selecting section 716. The process proceeds from step S56 to step S57.

In step S57, the signal quality calculating section 713 determines the signal quality of the OFDM frequency domain signal after the distortion correction from the transmission line distortion correcting section 110, and supplies the signal quality to the comparing section 715. Simultaneously, in step S57, the signal quality calculating section 714 determines the signal quality of the OFDM frequency domain signal after the distortion correction from the transmission line distortion correcting section 712, and supplies the signal quality to the comparing section 715.

Thereafter the process proceeds from step S57 to step S58, where one of better signal quality of the two OFDM frequency domain signals after the distortion correction which signals are obtained in the transmission line distortion correcting section 110 and the transmission line distortion correcting section 712, respectively, is selected, and supplied to the error correcting section 111.

Specifically, in step S58, the comparing section 715 compares the signal qualities supplied from the signal quality calculating sections 713 and 714, respectively, with each other. The comparing section 715 supplies a selecting signal indicating selection of one of better signal quality of the respective OFDM frequency domain signals from the transmission line distortion correcting sections 110 and 712 to the selecting section 716.

Further, in step S58, the selecting section 716 selects one of better signal quality of the OFDM frequency domain signals after the distortion correction from the transmission line distortion correcting sections 110 and 712, respectively, on the basis of the selecting signal from the comparing section 715. The selecting section 716 supplies the OFDM frequency domain signal of better signal quality to the error correcting section 111. Then the process proceeds from step S58 to step S59, where the error correcting section 111 performs a necessary error correcting process on the OFDM frequency domain signal from the selecting section 716. The error correcting section 111 thereby obtains decoded data, and outputs the decoded data.

Figure 20:
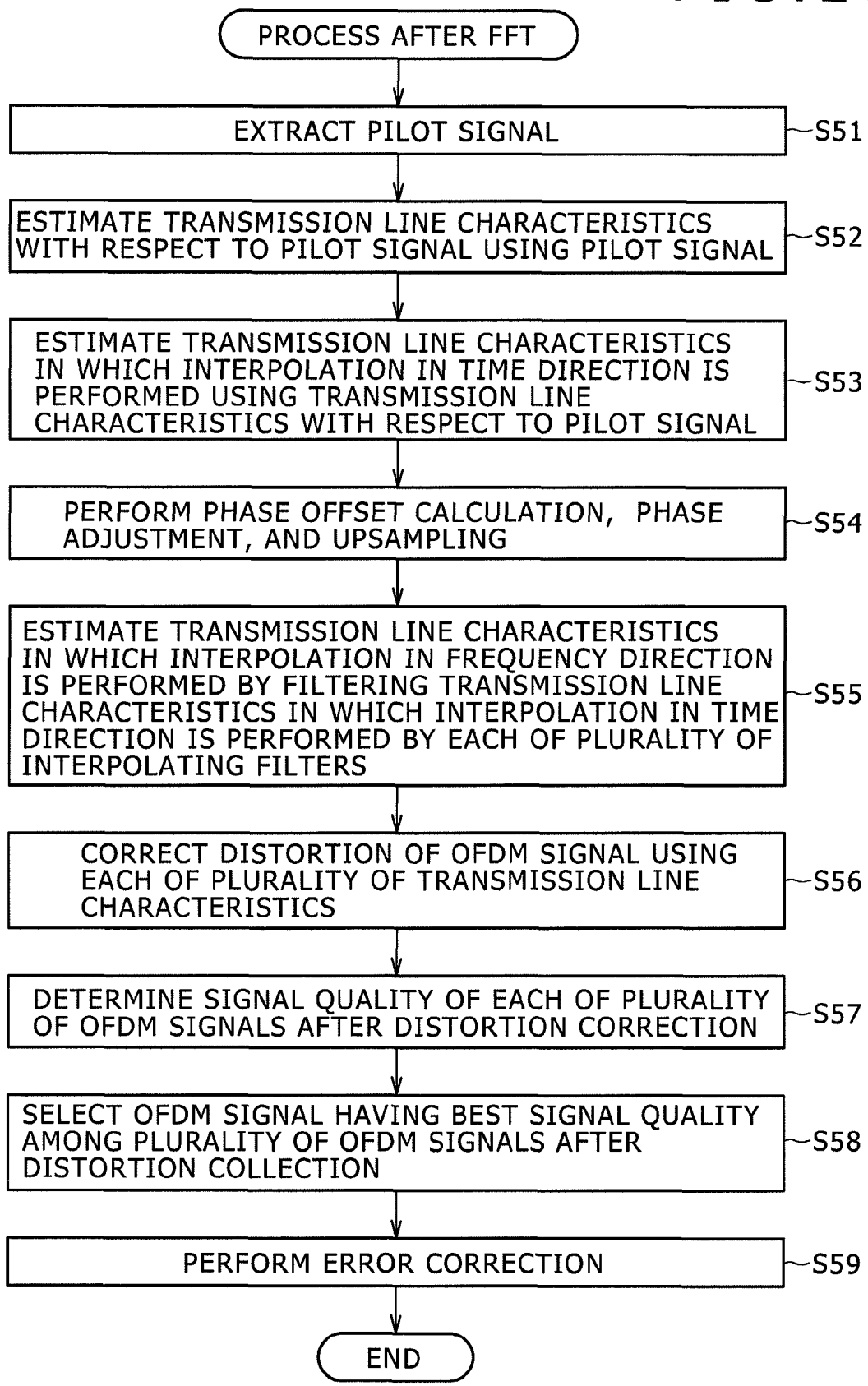
FIG. 20 is a flowchart of assistance in explaining a process performed after the FFT operation of an FFT section in the receiving device according to the fifth embodiment.

Incidentally, the process described with reference to the flowchart of FIG. 20 is performed in a pipeline.

As described above, frequency direction interpolation characteristic data in which interpolation in the frequency direction is performed is obtained by performing filtering with the two interpolating filters 421 and 422 (FIGS. 16 to 18) or the interpolating filters 209 and 729 (FIG. 19) as a plurality of interpolating filters the pass band of at least one of which is two bands as a plurality of bands. Therefore, even when multipaths are long-delay multipaths whose maximum delay time exceeds the cycle Tu/3 [seconds] of the time direction interpolation characteristic data, only a desired multipath can be extracted to prevent degradation in transmission line characteristic estimating accuracy.

Next, the series of processes described above can be carried out by hardware and also carried out by software. When the series of processes is to be carried out by software, a program constituting the software is installed onto a computer having a processor or the like.

Figure 21:
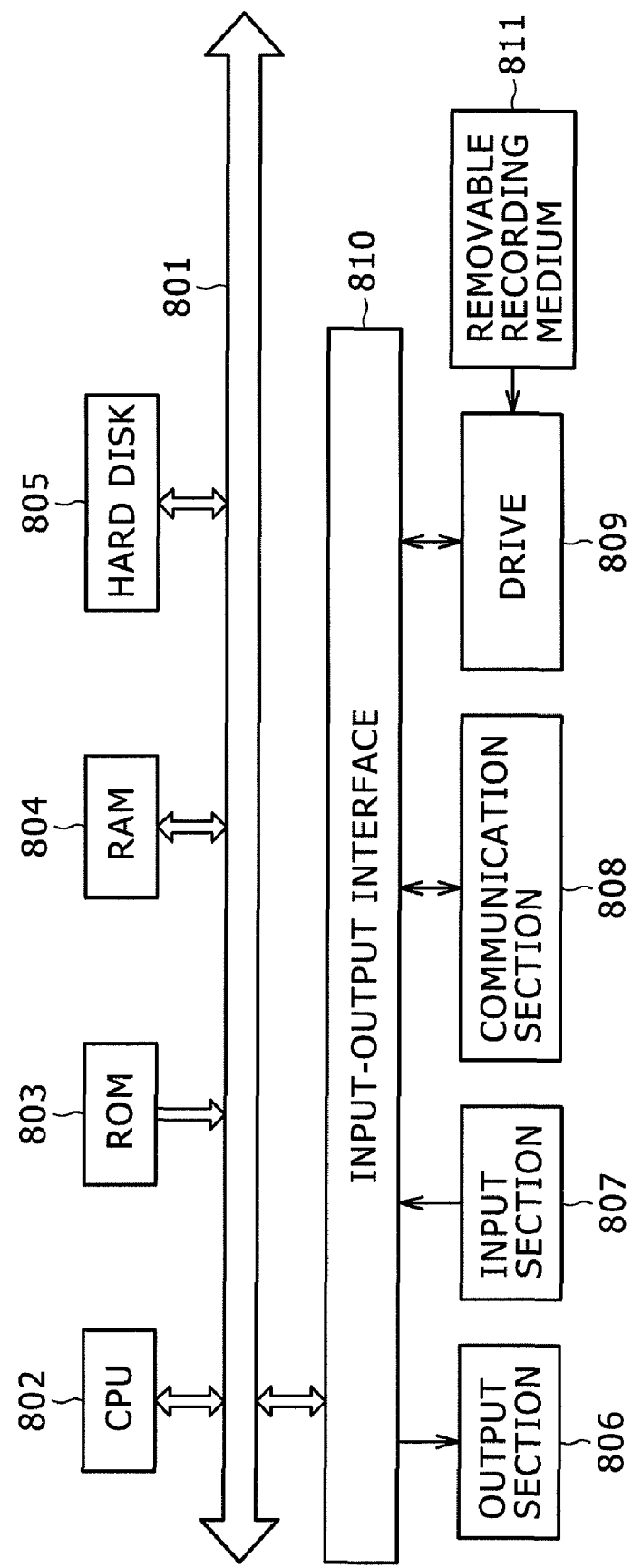
FIG. 21 is a block diagram showing an example of configuration of an embodiment of a computer to which the present invention is applied.

Accordingly, FIG. 21 shows an example of configuration of an embodiment of a computer on which the program for carrying out the above-described series of processes is installed.

The program can be recorded in advance on a hard disk 805 as a recording medium included in the computer or in a ROM 803.

Alternatively, the program can be stored (recorded) temporarily or permanently on a removable recording medium 811 such as a flexible disk, a CD-ROM (Compact Disc Read Only Memory), an MO (Magneto Optical) disk, a DVD (Digital Versatile Disc), a magnetic disk, a semiconductor memory. Such a removable recording medium 811 can be provided as so-called packaged software.

Incidentally, in addition to being installed from the removable recording medium 811 as described above onto the computer, the program can be transferred from a download site to the computer by radio via an artificial satellite for digital satellite broadcasting, or transferred to the computer by wire via a network such as a LAN (Local Area Network) and the Internet, and the computer can receive the thus transferred program by a communicating section 808 and install the program onto the built-in hard disk 805.

The computer includes a CPU (Central Processing Unit) 802. The CPU 802 is connected with an input-output interface 810 via a bus 801. When a user inputs a command via the input-output interface 810 by for example operating an input section 807 formed by a keyboard, a mouse, a microphone and the like, the CPU 802 executes a program stored in the ROM (Read Only Memory) 803 according to the command. Alternatively, the CPU 802 loads, into a RAM (Random Access Memory) 804, the program stored on the hard disk 805, the program transferred from a satellite or a network, received by the communicating section 808, and then installed onto the hard disk 805, or the program read from the removable recording medium 811 loaded in a drive 809 and then installed onto the hard disk 805. The CPU 802 then executes the program. The CPU 802 thereby performs the processes according to the above-described flowcharts or the processes performed by the configurations of the block diagrams described above. Then, as required, the CPU 802 for example outputs a result of the processes from an output section 806 formed by an LCD (Liquid Crystal Display), a speaker and the like via the input-output interface 810, transmits the result from the communicating section 808, or records the result onto the hard disk 805.

In the present specification, the process steps describing the program for making the computer perform the various processes do not necessarily need to be performed in time series in the order described as the flowcharts, but include processes performed in parallel or individually (for example parallel processing or processing based on audio).

The program may be processed by one computer, or may be subjected to distributed processing by a plurality of computers. Further, the program may be transferred to a remote computer and executed by the remote computer.

It is to be noted that embodiments of the present invention are not limited to the foregoing embodiments, and that various changes can be made without departing from the spirit of the present invention.

Specifically, in the foregoing embodiments, the receiving device is provided with the two interpolating filters 421 and 422 (FIGS. 16 to 18) or the two interpolating filters 209 and 729 having different pass bands as a plurality of interpolating filters. However, three or more interpolating filters having different pass bands can be provided as the plurality of interpolating filters. Further, a filter whose pass band is a plurality of different bands can be adopted as one or more interpolating filters that are a part of the three or more interpolating filters.

In addition, in the foregoing embodiments, the interpolating filter 422 (FIGS. 16 to 18) is a filter whose pass band is two bands. However, a filter whose pass band is three or more bands can be adopted as the interpolating filter 422. The same is true for the interpolating filter 729 (FIG. 19).

The present application contains subject matter related to that disclosed in Japanese Priority Patent Application JP 2008-212653 filed in the Japan Patent Office on Aug. 21, 2008, the entire content of which is hereby incorporated by reference.

What is claimed is:

1. A receiving device comprising:
pilot extracting means for extracting a pilot signal from an OFDM (Orthogonal Frequency Division Multiplexing) signal in which said pilot signal is arranged at a plurality of predetermined positions;
first estimating means for estimating transmission line characteristics as characteristics of a transmission line of said OFDM signal with respect to said pilot signal using said pilot signal, and outputting transmission line characteristic data indicating the transmission line characteristics;
second estimating means for estimating said transmission line characteristics in which interpolation in a time direction is performed using said transmission line characteristic data with respect to said pilot signal, and outputting transmission line characteristic data indicating the transmission line characteristics;
third estimating means for estimating said transmission line characteristics in which interpolation in a frequency direction is performed by filtering the transmission line characteristic data indicating said transmission line characteristics in which interpolation in the time direction is performed by an interpolating filter used for interpolation, and outputting transmission line characteristic data indicating the transmission line characteristics;
distortion correcting means for correcting distortion of said OFDM signal using the transmission line characteristic data indicating said transmission line characteristics in which interpolation in said frequency direction is performed; and
filter controlling means for controlling a pass band of said interpolating filter, said filter controlling means being capable of control that makes said pass band of said interpolating filter a plurality of bands.

2. The receiving device according to claim 1,
wherein said transmission line characteristics in which interpolation in said time direction is performed are obtained for every N subcarriers, and
when effective symbol length of an OFDM symbol of said OFDM signal, the effective symbol length not including a guard interval, is Tu seconds, a total of the plurality of bands as said pass band is Tu/N seconds or less.

3. The receiving device according to claim 1,
wherein said filter controlling means controls said pass band by selecting one said interpolating filter from a plurality of said interpolating filters different from each other in said pass band, and
the pass band of at least one of the plurality of said interpolating filters is a plurality of bands.

4. The receiving device according to claim 3,
wherein said filter controlling means selects one said interpolating filter from the plurality of said interpolating filters on a basis of signal quality of said OFDM signal resulting from distortion correction performed using said transmission line characteristic data obtained by filtering in each of the plurality of said interpolating filters.

5. A signal processing method wherein when a receiving device for receiving an OFDM (Orthogonal Frequency Division Multiplexing) signal in which a pilot signal is arranged at a plurality of predetermined positions, the method comprising:
extracting said pilot signal from said OFDM signal,
estimating transmission line characteristics as characteristics of a transmission line of said OFDM signal with respect to said pilot signal using said pilot signal and outputs transmission line characteristic data indicating the transmission line characteristics,
estimating said transmission line characteristics in which interpolation in a time direction is performed using said transmission line characteristic data with respect to said pilot signal and outputting transmission line characteristic data indicating the transmission line characteristics,
estimating said transmission line characteristics in which interpolation in a frequency direction is performed by filtering the transmission line characteristic data indicating said transmission line characteristics in which interpolation in the time direction is performed by an interpolating filter used for interpolation and outputting transmission line characteristic data indicating the transmission line characteristics, and
correcting distortion of said OFDM signal using the transmission line characteristic data indicating said transmission line characteristics in which interpolation in said frequency direction is performed, as control of a pass band of said interpolating filter, control that makes the pass band of said interpolating filter a plurality of bands is performed.

6. A non-transitory computer-readable storage medium having stored thereon a program for making a computer perform the steps comprising:
extracting a pilot signal from an OFDM (Orthogonal Frequency Division Multiplexing) signal in which said pilot signal is arranged at a plurality of predetermined positions;
estimating transmission line characteristics as characteristics of a transmission line of said OFDM signal with respect to said pilot signal using said pilot signal, and outputting transmission line characteristic data indicating the transmission line characteristics;
estimating said transmission line characteristics in which interpolation in a time direction is performed using said transmission line characteristic data with respect to said pilot signal, and outputting transmission line characteristic data indicating the transmission line characteristics;
estimating said transmission line characteristics in which interpolation in a frequency direction is performed by filtering the transmission line characteristic data indicating said transmission line characteristics in which interpolation in the time direction is performed by an interpolating filter used for interpolation, and outputting transmission line characteristic data indicating the transmission line characteristics;
correcting distortion of said OFDM signal using the transmission line characteristic data indicating said transmission line characteristics in which interpolation in said frequency direction is performed; and controlling a pass band of said interpolating filter, said filter controlling means being capable of control that makes said pass band of said interpolating filter a plurality of bands.

7. A receiving device comprising:

pilot extracting means for extracting a pilot signal from an OFDM (Orthogonal Frequency Division Multiplexing) signal in which said pilot signal is arranged at a plurality of predetermined positions;

first estimating means for estimating transmission line characteristics as characteristics of a transmission line of said OFDM signal with respect to said pilot signal using said pilot signal, and outputting transmission line characteristic data indicating the transmission line characteristics;

second estimating means for estimating said transmission line characteristics in which interpolation in a time direction is performed using said transmission line characteristic data with respect to said pilot signal, and outputting transmission line characteristic data indicating the transmission line characteristics;

third estimating means for estimating a plurality of said transmission line characteristics in which interpolation in a frequency direction is performed by filtering the transmission line characteristic data indicating said transmission line characteristics in which interpolation in the time direction is performed by each of a plurality of interpolating filters having different pass bands, and outputting pieces of transmission line characteristic data indicating the transmission line characteristics;

a plurality of distortion correcting means for correcting distortion of said OFDM signal using each of the pieces of transmission line characteristic data indicating the plurality of said transmission line characteristics in which interpolation in said frequency direction is performed;

signal quality calculating means for determining signal quality of each of a plurality of said OFDM signals after the distortion correction; and selecting means for selecting one said OFDM signal from the plurality of said OFDM signals after the distortion correction on a basis of said signal quality;

wherein a pass band of at least one of the plurality of said interpolating filters is a plurality of bands.

8. The receiving device according to claim 7, wherein said transmission line characteristics in which interpolation in said time direction is performed are obtained for every N subcarriers, and when effective symbol length of an OFDM symbol of said OFDM signal, the effective symbol length not including a guard interval, is Tu seconds, a total of the plurality of bands as said pass band is Tu/N seconds or less.

9. A signal processing method wherein when a receiving device for receiving an OFDM (Orthogonal Frequency Division Multiplexing) signal in which a pilot signal is arranged at a plurality of predetermined positions extracts said pilot signal from said OFDM signal, the method comprising:

estimating transmission line characteristics as characteristics of a transmission line of said OFDM signal with respect to said pilot signal using said pilot signal and outputs transmission line characteristic data indicating the transmission line characteristics, estimating said transmission line characteristics in which interpolation in a time direction is performed using said transmission line characteristic data with respect to said pilot signal and outputting transmission line characteristic data indicating the transmission line characteristics, estimating a plurality of said transmission line characteristics in which interpolation in a frequency direction is performed by filtering the transmission line characteristic data indicating said transmission line characteristics in which interpolation in the time direction is performed by each of a plurality of interpolating filters having different pass bands and outputting pieces of transmission line characteristic data indicating the transmission line characteristics, correcting distortion of said OFDM signal using each of the pieces of transmission line characteristic data indicating the plurality of said transmission line characteristics in which interpolation in said frequency direction is performed, determining signal quality of each of a plurality of said OFDM signals after the distortion correction, and selecting one said OFDM signal from the plurality of said OFDM signals after the distortion correction on a basis of said signal quality, a pass band of at least one of the plurality of said interpolating filters is a plurality of bands.

10. A non-transitory computer-readable storage medium having stored thereon a program for making a computer perform the steps comprising:

extracting a pilot signal from an OFDM (Orthogonal Frequency Division Multiplexing) signal in which said pilot signal is arranged at a plurality of predetermined positions;

estimating transmission line characteristics as characteristics of a transmission line of said OFDM signal with respect to said pilot signal using said pilot signal, and outputting transmission line characteristic data indicating the transmission line characteristics;

estimating said transmission line characteristics in which interpolation in a time direction is performed using said transmission line characteristic data with respect to said pilot signal, and outputting transmission line characteristic data indicating the transmission line characteristics;

estimating a plurality of said transmission line characteristics in which interpolation in a frequency direction is performed by filtering the transmission line characteristic data indicating said transmission line characteristics in which interpolation in the time direction is performed by each of a plurality of interpolating filters having different pass bands, and outputting pieces of transmission line characteristic data indicating the transmission line characteristics;

correcting distortion of said OFDM signal using each of the pieces of transmission line characteristic data indicating the plurality of said transmission line characteristics in which interpolation in said frequency direction is performed;

determining signal quality of each of a plurality of said OFDM signals after the distortion correction; and selecting one said OFDM signal from the plurality of said OFDM signals after the distortion correction on a basis of said signal quality;

wherein a pass band of at least one of the plurality of said interpolating filters is a plurality of bands.

11. A receiving device comprising:

a pilot extracting section configured to extract a pilot signal from an OFDM (Orthogonal Frequency Division Multiplexing) signal in which said pilot signal is arranged at a plurality of predetermined positions;

a first estimating section configured to estimate transmission line characteristics as characteristics of a transmission line of said OFDM signal with respect to said pilot signal using said pilot signal, and output transmission line characteristic data indicating the transmission line characteristics;

a second estimating section configured to estimate said transmission line characteristics in which interpolation in a time direction is performed using said transmission line characteristic data with respect to said pilot signal, and output transmission line characteristic data indicating the transmission line characteristics;

a third estimating section configured to estimate said transmission line characteristics in which interpolation in a frequency direction is performed by filtering the transmission line characteristic data indicating said transmission line characteristics in which interpolation in the time direction is performed by an interpolating filter used for interpolation, and output transmission line characteristic data indicating the transmission line characteristics;

a distortion correcting section configured to correct distortion of said OFDM signal using the transmission line characteristic data indicating said transmission line characteristics in which interpolation in said frequency direction is performed; and a filter controlling section configured to control a pass band of said interpolating filter, said filter controlling section being capable of control that makes said pass band of said interpolating filter a plurality of bands.

12. A receiving device comprising:

a pilot extracting section configured to extract a pilot signal from an OFDM (Orthogonal Frequency Division Multiplexing) signal in which said pilot signal is arranged at a plurality of predetermined positions;

a first estimating section configured to estimate transmission line characteristics as characteristics of a transmission line of said OFDM signal with respect to said pilot signal using said pilot signal, and output transmission line characteristic data indicating the transmission line characteristics;

a second estimating section configured to estimate said transmission line characteristics in which interpolation in a time direction is performed using said transmission line characteristic data with respect to said pilot signal, and output transmission line characteristic data indicating the transmission line characteristics;

a third estimating section configured to estimate a plurality of said transmission line characteristics in which interpolation in a frequency direction is performed by filtering the transmission line characteristic data indicating said transmission line characteristics in which interpolation in the time direction is performed by each of a plurality of interpolating filters having different pass bands, and output pieces of transmission line characteristic data indicating the transmission line characteristics;

a plurality of distortion correcting sections configured to correct distortion of said OFDM signal using each of the pieces of transmission line characteristic data indicating the plurality of said transmission line characteristics in which interpolation in said frequency direction is performed;

a signal quality calculating section configured to determine signal quality of each of a plurality of said OFDM signals after the distortion correction; and a selecting section configured to select one said OFDM signal from the plurality of said OFDM signals after the distortion correction on a basis of said signal quality;

wherein a pass band of at least one of the plurality of said interpolating filters is a plurality of bands.

* * * * *